US012208622B2

(12) United States Patent
Tsuji et al.

(10) Patent No.: US 12,208,622 B2
(45) Date of Patent: Jan. 28, 2025

(54) LIQUID SUPPLYING SYSTEM INCLUDING TANK AND LIQUID BOTTLE CONNECTABLE TO THE TANK

(71) Applicant: BROTHER KOGYO KABUSHIKI KAISHA, Nagoya (JP)

(72) Inventors: Takuya Tsuji, Ama-gun (JP); Yoshinori Osakabe, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 155 days.

(21) Appl. No.: 17/587,618

(22) Filed: Jan. 28, 2022

(65) Prior Publication Data

US 2022/0288939 A1 Sep. 15, 2022

Related U.S. Application Data

(63) Continuation of application No. 16/724,762, filed on Dec. 23, 2019, now Pat. No. 11,235,578.

(30) Foreign Application Priority Data

Dec. 25, 2018 (JP) ................................ 2018-241375

(51) Int. Cl.
*B41J 2/175* (2006.01)

(52) U.S. Cl.
CPC ....... *B41J 2/17509* (2013.01); *B41J 2/17513* (2013.01); *B41J 2/17523* (2013.01); *B41J 2/17596* (2013.01)

(58) Field of Classification Search
CPC ........................ B41J 2/17509; B41J 2/17513; B41J 2/17523; B41J 2/17596
See application file for complete search history.

(56) References Cited

U.S. PATENT DOCUMENTS 4,907,019 A 3/1990 Stephens
5,343,226 A 8/1994 Niedermeyeyr et al.
(Continued)

FOREIGN PATENT DOCUMENTS

CN 2506567 Y 8/2002
CN 101229723 A 7/2008
(Continued)

OTHER PUBLICATIONS

Office Action issued in corresponding Chinese Patent Application No. 202210845614.4, Jul. 5, 2023.
(Continued)

*Primary Examiner* — Jason K Niesz
(74) *Attorney, Agent, or Firm* — Merchant & Gould P.C.

(57) ABSTRACT

A liquid supplying system includes a tank, a first tubular portion, a second tubular portion, a sleeve portion, and a liquid bottle. The first and second tubular portions have inner ends positioned inside a storage chamber of the tank, and outer ends positioned outside of the storage chamber. The first and second tubular portions are positioned inside the sleeve portion. The sleeve portion includes a first screw portion and a first engagement portion. The liquid bottle includes an outer sleeve connectable to the sleeve portion. The sleeve portion includes a second screw portion threadingly engageable with the first screw portion, and a second engagement portion engageable with the first engagement portion. The first engagement portion can guide the second engagement portion to move in a direction parallel to a center axis of the sleeve portion during connection of the outer sleeve to the sleeve portion.

30 Claims, 27 Drawing Sheets

(56) References Cited

U.S. PATENT DOCUMENTS

| | | | |
|---|---|---|---|
| 5,530,531 | A | 6/1996 | Girard |
| 5,682,874 | A | 11/1997 | Grabenkort et al. |
| 5,687,777 | A | 11/1997 | Dobson et al. |
| 5,920,333 | A | 7/1999 | Bates |
| 6,022,101 | A | 2/2000 | Sabonis |
| 6,032,010 | A | 2/2000 | Kim et al. |
| 6,079,823 | A | 6/2000 | Droege |
| 6,164,768 | A | 12/2000 | Murphy et al. |
| 6,213,339 | B1 | 4/2001 | Lee |
| 6,412,666 | B1 | 7/2002 | Hogan et al. |
| 6,585,016 | B1 | 7/2003 | Falligant et al. |
| 7,178,908 | B2 | 2/2007 | Katayama |
| 8,235,510 | B2 | 8/2012 | Lu et al. |
| 2002/0118259 | A1 * | 8/2002 | Ranganathan ....... B41J 2/17523 347/85 |
| 2004/0061748 | A1 | 4/2004 | Kuwabara et al. |
| 2005/0011916 | A1 | 1/2005 | Battista et al. |
| 2005/0068388 | A1 | 3/2005 | Katayama |
| 2006/0164478 | A1 | 7/2006 | Fukazawa |
| 2012/0038719 | A1 | 2/2012 | Shimizu et al. |
| 2015/0217573 | A1 * | 8/2015 | Gonzalez ................. B41J 2/175 347/85 |
| 2016/0089893 | A1 | 3/2016 | Osakabe et al. |
| 2017/0050442 | A1 | 2/2017 | Tamarez Gomez et al. |
| 2017/0087858 | A1 | 3/2017 | Hayashi |
| 2018/0001650 | A1 | 1/2018 | Miyashita et al. |
| 2018/0104957 | A1 | 4/2018 | Rietbergen et al. |
| 2018/0178541 | A1 | 6/2018 | Kobayashi et al. |
| 2018/0272722 | A1 | 9/2018 | Murphy et al. |
| 2018/0272723 | A1 | 9/2018 | Shinada et al. |

FOREIGN PATENT DOCUMENTS

| | | | |
|---|---|---|---|
| CN | 105459610 | A | 4/2016 |
| CN | 207955030 | U | 10/2018 |
| JP | 2006-205528 | A | 8/2006 |
| JP | 2012-20495 | A | 2/2012 |
| JP | 2018-65363 | A | 4/2018 |
| WO | 2007/102912 | A2 | 9/2007 |

OTHER PUBLICATIONS

Office Action issued in corresponding Chinese patent application 202210845614.4, Jan. 26, 2024.

* cited by examiner

LIQUID SUPPLYING SYSTEM INCLUDING TANK AND LIQUID BOTTLE CONNECTABLE TO THE TANK

CROSS REFERENCE TO RELATED APPLICATION

This application is a continuation of U.S. patent application Ser. No. 16/724,762, filed Dec. 23, 2019, now U.S. Pat. No. 11,235,578, which claims priority from Japanese Patent Application No. 2018-241375, filed Dec. 25, 2018. The entire content of the priority applications is incorporated herein by reference.

TECHNICAL FIELD

The present disclosure relates to a liquid supplying system including a liquid bottle storing liquid therein, and a tank to which the liquid bottle is connected.

BACKGROUND

Conventionally, there is known a liquid supplying system in which liquid is configured to be supplied to a tank from a cartridge connected to the tank, by way of so called "chicken feed method" as described in Japanese Patent Application Publication No. 2006-205528. According to this method, successive liquid supply from the cartridge to the tank is performed each time the liquid stored in the tank is consumed to maintain a level of the liquid stored in the tank constant.

Further, Japanese Patent Application Publication No. 2012-020495 discloses a liquid supplying system in which liquid can be replenished into a tank through an injection opening of the tank when the liquid in the tank is consumed. For example, a liquid bottle may be inserted into the injection opening to replenish liquid in the liquid bottle into the tank.

SUMMARY

Here, assume that the above-described chicken feed system is employed in the liquid supplying system where the liquid bottle is inserted in the injection opening. In such a liquid supplying system, a user should be free from a need to grip the liquid bottle while liquid is being supplied from the liquid bottle into the tank.

Further, in such liquid supplying system, a liquid tank storing liquid of a particular color or a particular kind (which should be inserted into a corresponding tank that stores liquid of the same color or the same kind) should be prevented from being inserted in an injection opening of a tank that stores liquid of a different color or kind from the particular color or kind of the liquid stored in the liquid bottle.

In view of the foregoing, it is an object of the disclosure to provide a liquid supplying system capable of supplying liquid from a liquid bottle to a tank without user's gripping of the liquid bottle, and capable of avoiding erroneous insertion of the liquid bottle into the tank.

In order to attain the above and other objects, according to one aspect, the disclosure provides a liquid supplying system including a tank, a first tubular portion, a second tubular portion, a sleeve portion, and a liquid bottle. The tank includes: a casing defining therein a storage chamber for storing a liquid therein; and an air communicating portion formed in the casing and having an air communication opening through which air is allowed to communicate between the storage chamber and an atmosphere. The first tubular portion has an inner end positioned inside the storage chamber and an outer end positioned outside of the storage chamber. The inner end is an open end and is positioned lower than a part of the air communicating portion. The outer end is an open end to allow the storage chamber to communicate with an outside of the tank. The second tubular portion has an inner end positioned inside the storage chamber and an outer end positioned outside of the storage chamber. The inner end is an open end and is positioned lower than the part of the air communicating portion. The outer end is an open end to allow the storage chamber to communicate with the outside of the tank. The sleeve portion is provided at the tank and extends in a predetermined direction to define a center axis extending in the predetermined direction. The first tubular portion and the second tubular portion are positioned inside an outermost profile of the sleeve portion in a cross-section of the sleeve portion taken along a plane perpendicular to the center axis of the sleeve portion. The sleeve portion has a peripheral surface formed with a first screw portion and a first engagement portion. The liquid bottle includes: an outer wall defining therein an internal space for storing the liquid; and an outer sleeve connectable to the sleeve portion. The outer sleeve provides communication between the internal space and an outside of the outer wall. The outer sleeve defines an axis extending in an axial direction and has a peripheral surface formed with a second screw portion threadingly engageable with the first screw portion, and a second engagement portion engageable with the first engagement portion. The first engagement portion is configured to guide the second engagement portion to move in a direction parallel to the center axis of the sleeve portion in a process to connect the outer sleeve to the sleeve portion.

According to another aspect, the disclosure also provides a liquid supplying system including: a plurality of tanks; and a plurality of liquid bottles provided in one-to-one correspondence with the plurality of tanks, each of the plurality of liquid bottles being attachable to a corresponding one of the plurality of tanks. Preferably, each of the plurality of tanks includes a casing, an air communication portion, a first tubular portion, a second tubular portion, and a sleeve portion. The casing defines therein a storage chamber for storing a liquid therein. The air communicating portion is formed in the casing and has an air communication opening through which air is allowed to communicate between the storage chamber and an atmosphere. The first tubular portion has an inner end positioned inside the storage chamber and an outer end positioned outside of the storage chamber. The inner end is an open end and is positioned lower than a part of the air communicating portion. The outer end is an open end to allow the storage chamber to communicate with an outside of the tank. The second tubular portion has an inner end positioned inside the storage chamber and an outer end positioned outside of the storage chamber. The inner end is an open end and is positioned lower than the part of the air communicating portion. The outer end is an open end to allow the storage chamber to communicate with the outside of the tank. The sleeve portion extends in a predetermined direction to define a center axis extending in the predetermined direction. The first tubular portion and the second tubular portion are positioned inside an outermost profile of the sleeve portion in a cross-section of the sleeve portion taken along a plane perpendicular to the center axis of the sleeve portion. The sleeve portion has a peripheral surface formed with a first screw portion. Preferably, each of the plurality of liquid bottles includes: an outer wall defining therein an internal space for storing liquid; and an outer sleeve connectable to corresponding one of the sleeve portions and providing communication between the internal space and an outside of the outer wall. The outer sleeve defines an axis extending in an axial direction and has a peripheral surface formed with a second screw portion threadingly engageable with the first screw portion in a process to connect the outer sleeve to the sleeve portion. Preferably, a plurality of the first screw portions provide thread pitches different from one another; and a plurality of the second screw portions provide thread pitches different from one another.

According to still another aspect, the disclosure also provides a liquid supplying system including a tank, a first tubular portion, a second tubular portion, a sleeve portion, and a liquid bottle. The tank includes: a casing defining therein a storage chamber for storing a liquid therein; and an air communicating portion formed in the casing and having an air communication opening through which air is allowed to communicate between the storage chamber and an atmosphere. The first tubular portion has an inner end positioned inside the storage chamber and an outer end positioned outside of the storage chamber. The inner end is an open end and positioned lower than a part of the air communicating portion. The outer end is an open end to allow the storage chamber to communicate with an outside of the tank. The second tubular portion has an inner end positioned inside the storage chamber and an outer end positioned outside of the storage chamber. The inner end is an open end and is positioned lower than the part of the air communicating portion. The outer end is an open end to allow the storage chamber to communicate with the outside of the tank. The sleeve portion is provided at the tank and extends in a predetermined direction to define a center axis extending in the predetermined direction. The first tubular portion and the second tubular portion are positioned inside an outermost profile of the sleeve portion in a cross-section of the sleeve portion taken along a plane perpendicular to the center axis of the sleeve portion. The sleeve portion has a peripheral surface formed with a screw portion and a first engagement portion, the first engagement portion being a concave portion. The liquid bottle includes: an outer wall defining therein an internal space for storing the liquid; and an outer sleeve connectable to the sleeve portion and providing communication between the internal space and an outside of the outer wall. The outer sleeve defines an axis extending in an axial direction and has a peripheral surface formed with a second engagement portion engageable with the first engagement portion and the screw portion, the second engagement portion being a convex portion. The second engagement portion is guided by the first engagement portion to move in a direction parallel to the center axis of the sleeve portion in a process to connect the outer sleeve to the sleeve portion, Preferably, the first engagement portion is formed in one of turns constituting a thread of the screw portion, the one of the turns being positioned closest to a tip end of the sleeve portion, and the second engagement portion has a length not more than a pitch of a thread of the screw portion in the direction parallel to the center axis of the sleeve portion.

DETAILED DESCRIPTION

A multifunction peripheral 10 as an example of a liquid supplying system according to one embodiment will be described with reference to FIGS. 1 through 16.

Figure 1A:
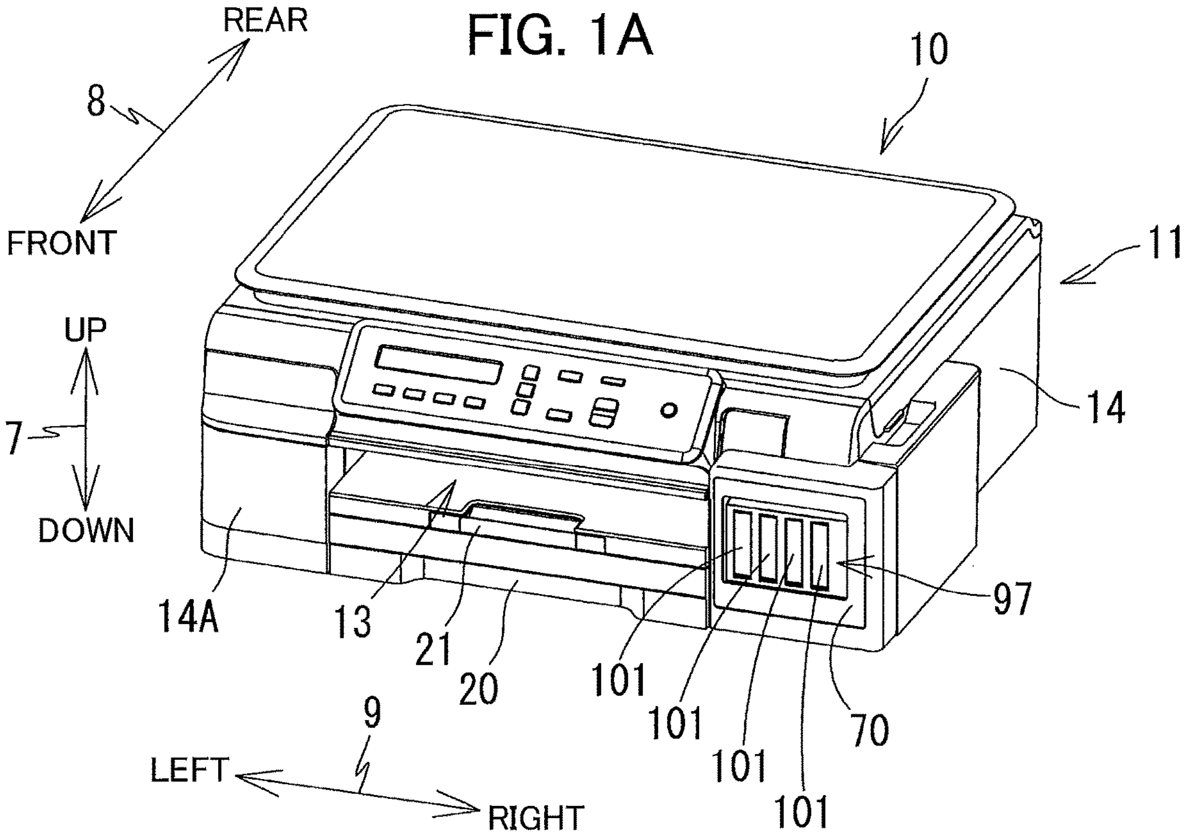
FIG. 1A is a perspective view of a multifunction peripheral according to an embodiment, illustrating a state where a cover 70 is in a closed position thereof.
Figure 1B:
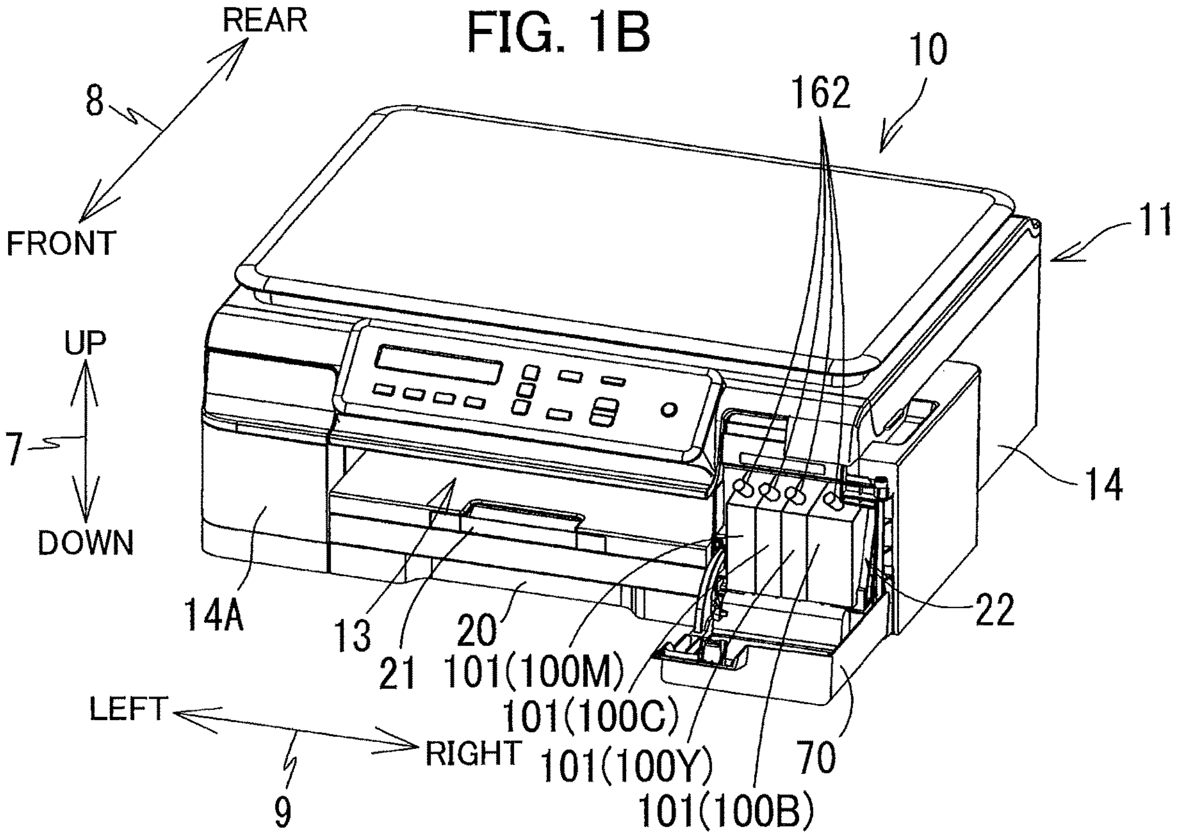
FIG. 1B is a perspective view of the multifunction peripheral according to the embodiment, illustrating a state where the cover 70 is in an open position thereof.
Figure 2:
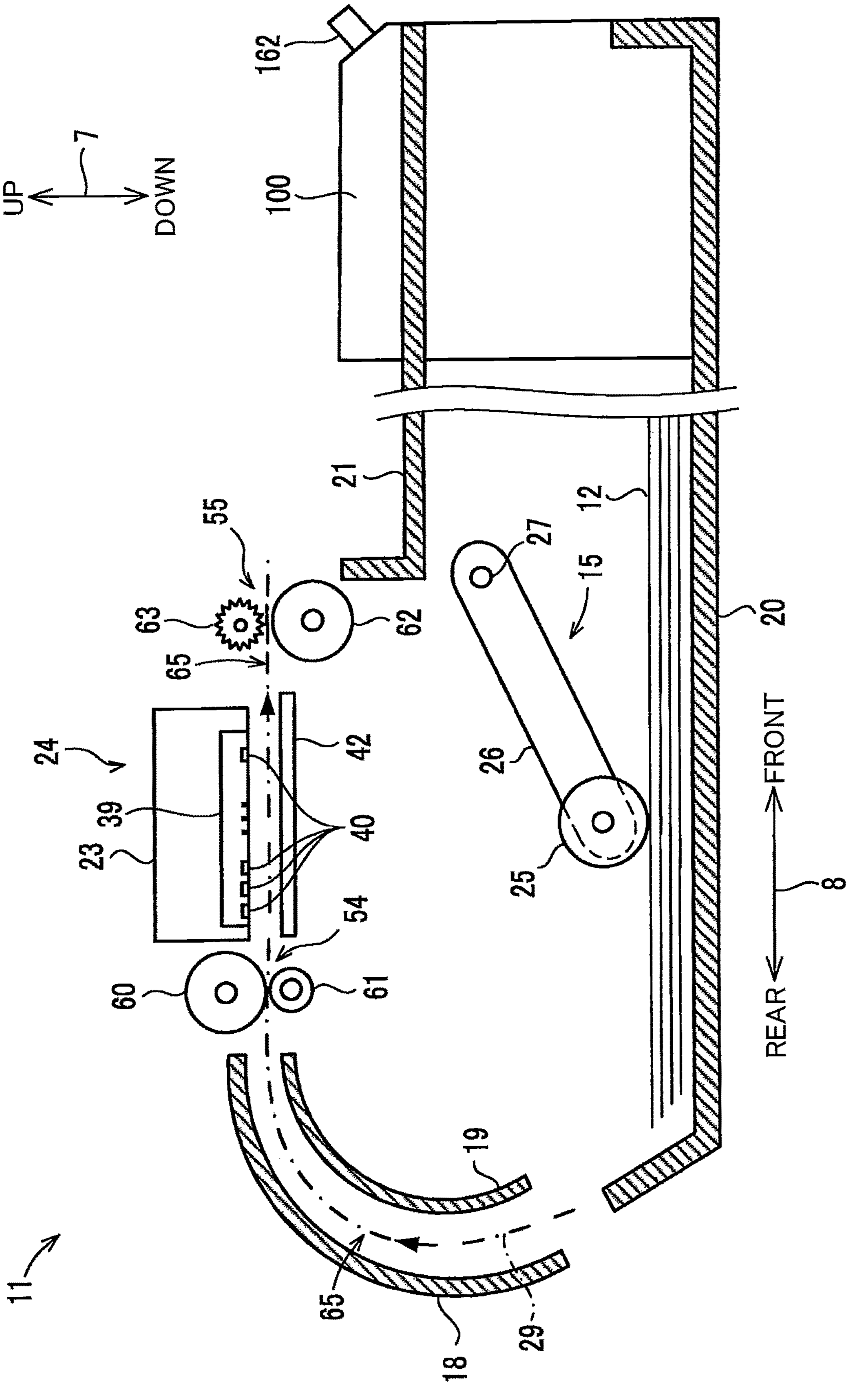
FIG. 2 is a vertical cross-sectional view schematically illustrating an internal configuration of a printer portion of the multifunction peripheral according to the embodiment.

In the following description, upward, downward, frontward, rearward, leftward and rightward directions related to the multifunction peripheral 10 will be referred to assuming that the multifunction peripheral 10 is disposed on a horizontal plane so as to be operable, as shown in FIGS. 1A through 2. Note that this posture of the multifunction peripheral 10 illustrated in FIG. 1A will also be referred to as an "operable posture" thereof Specifically, an upward/downward direction 7 of the multifunction peripheral 10 is defined on a basis of the operable posture of the multifunction peripheral 10. A frontward/rearward direction 8 is defined assuming that a surface of the multifunction peripheral 10 formed with an opening 13 (FIG. 1A) is a front surface of the multifunction peripheral 10 in the operable posture. A leftward/rightward direction 9 is defined on a basis of an assumption that the multifunction peripheral 10 in the operable posture is viewed from its front surface. In the present embodiment, in the operable posture of the multifunction peripheral 10, the upward/downward direction 7 is parallel to a vertical direction, and the frontward/rearward direction 8 and the leftward/rightward direction 9 are parallel to a horizontal direction. Further, the upward/downward direction 7, the frontward/rearward direction 8, and the leftward/rightward direction 9 are perpendicular to one another.

[Overall Structure of the Multifunction Peripheral 10]

As illustrated in FIGS. 1A and 1B, the multifunction peripheral 10 has a substantially rectangular parallelepiped shape. The multifunction peripheral 10 has a lower portion in which a printer portion 11 is provided. The printer portion 11 is configured to record an image on a sheet of paper 12 (see FIG. 2) in accordance with an inkjet recording method. The printer portion 11 includes a housing 14 whose front wall 14A is formed with the opening 13.

As illustrated in FIG. 2, within the housing 14 disposed are a sheet supply unit 15, a sheet supply tray 20, a discharge tray 21, a pair of conveying rollers 54, a recording portion 24, a pair of discharging rollers 55, a platen 42, and ink tanks 100 (an example of a tank). The multifunction peripheral 10 has various functions such as a facsimile function and a printing function.

[Sheet Supply Tray 20 and Discharge Tray 21]

As illustrated in FIGS. 1A and 1B, the sheet supply tray 20 is configured to be inserted into and removed from the housing 14 through the opening 13 in the frontward/rearward direction 8. The opening 13 is positioned at the front surface of the multifunction peripheral 10 and at a center portion of the front wall 14A of the housing 14 in the leftward/rightward direction 9. As illustrated in FIG. 2, the sheet supply tray 20 is configured to support the sheets 12 in a stacked state.

The discharge tray 21 is disposed above the sheet supply tray 20, as illustrated in FIGS. 1A to 2. The discharge tray 21 is configured to support the sheets 12 discharged by the discharging rollers 55 from a portion between the recording portion 24 and the platen 42.

[Sheet Supply Unit 15]

The sheet supply unit 15 is configured to supply each of the sheets 12 supported in the sheet supply tray 20 onto a conveying path 65. As illustrated in FIG. 2. the sheet supply unit 15 includes a sheet supply roller 25, a sheet supply arm 26, and a shaft 27. The sheet supply roller 25 is rotatably supported by a tip end portion of the sheet supply arm 26. The sheet supply roller 25 is configured to be driven by a sheet supply motor (not illustrated). The shaft 27 is supported by a frame (not illustrated) of the printer portion 11. The sheet supply arm 26 has a base end portion pivotally movable about an axis of the shaft 27. The sheet supply arm 26 is urged to pivot toward the sheet supply tray 20 by its own weight or resiliently urging force of a spring, for example.

[Conveying Path 65]

As illustrated in FIG. 2, the conveying path 65 is a space partially defined by an outer guide member 18 and an inner guide member 19 arranged to oppose each other at a predetermined interval inside the printer portion 11. The conveying path 65 extends rearward from a rear end portion of the sheet supply tray 20, and then, makes a U-turn frontward while extending upward at a rear portion of the printer portion 11, extends through a space between the recording portion 24 and the platen 42, and reaches the discharge tray 21.

Figure 3:
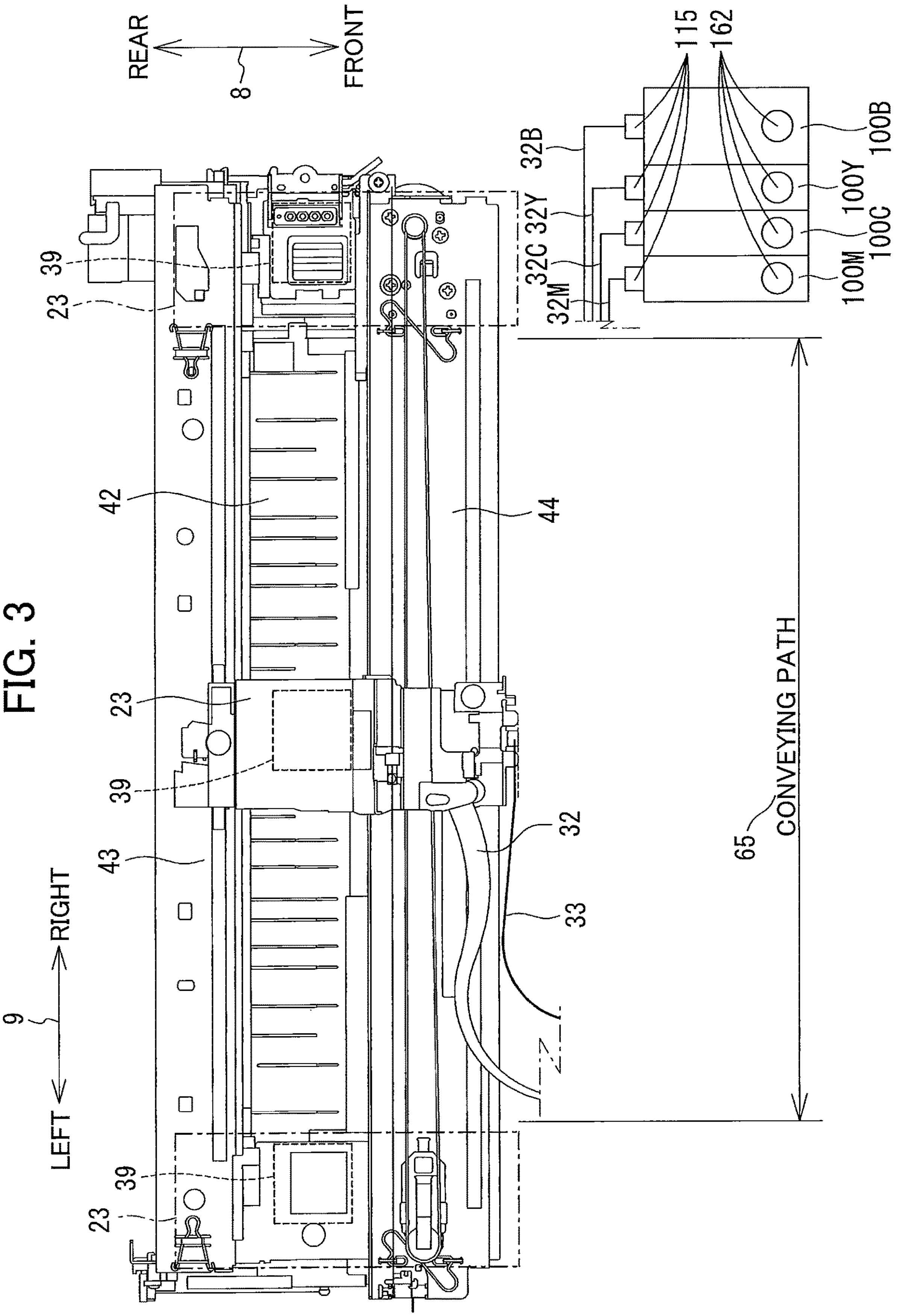
FIG. 3 is a plan view illustrating arrangement of a carriage 23, a platen 42, guide rails 43 and 44, and ink tanks 100 in the multifunction peripheral according to the embodiment.

As illustrated in FIG. 3, a portion of the conveying path 65 positioned between the conveying rollers 54 and the discharging rollers 55 is provided substantially at a center portion of the multifunction peripheral 10 in the leftward/rightward direction 9, and extends in the frontward/rearward direction 8. A direction in which each sheet 12 is configured to be conveyed along the conveying path 65 will be referred to as a conveying direction 29 (indicated by a dashed-dotted arrow in FIG. 2).

[Conveying Rollers 54]

As illustrated in FIG. 2, the pair of conveying rollers 54 is disposed at the conveying path 65. The conveying rollers 54 include a conveying roller 60 and a pinch roller 61 arranged opposite to the conveying roller 60. The conveying roller 60 is configured to be driven by a conveying motor (not illustrated). The pinch roller 61 is configured to be rotated following rotation of the conveying roller 60. As the conveying roller 60 makes rotation in response to rotation of the conveying motor, each of the sheets 12 is nipped between the conveying roller 60 and the pinch roller 61 to be conveyed in the conveying direction 29.

[Discharging Rollers 55]

As illustrated in FIG. 2, the pair of discharging rollers 55 is disposed downstream relative to the pair of conveying rollers 54 in the conveying direction 29 at the conveying path 65. The discharging rollers 55 include a discharging roller 62 and a spur 63 positioned opposite to the discharging roller 62. The discharging roller 62 is configured to be driven by the conveying motor (not illustrated). The spur 63 is configured to be rotated following rotation of the discharging roller 62. As the discharging roller 62 makes rotation in response to the rotation of the conveying motor, each sheet 12 is nipped between the discharging roller 62 and the spur 63 and is conveyed in the conveying direction 29.

[Recording Portion 24]

As illustrated in FIG. 2, the recording portion 24 is disposed at a position between the pair of conveying rollers 54 and the pair of discharging rollers 55 at the conveying path 65. The recording portion 24 is positioned to oppose the platen 42 in the upward/downward direction 7, with the conveying path 65 interposed between the recording portion 24 and the platen 42. The recording portion 24 includes a carriage 23 and a recording head 39.

As illustrated in FIG. 3, the carriage 23 is supported by guide rails 43 and 44. The guide rails 43 and 44 extend in the leftward/rightward direction 9 and are spaced apart from each other in the frontward/rearward direction 8. The guide rails 43 and 44 are supported by the frame (not shown) of the printer portion 11.

The carriage 23 is connected to a well-known belt mechanism provided at the guide rail 44. The belt mechanism is driven by a carriage-driving motor (not illustrated). The carriage 23 connected to the belt mechanism is configured to perform reciprocating movements in the leftward/rightward direction 9 in response to driving force of the carriage-driving motor. The carriage 23 is configured to move to exceed a right end and a left end of the conveying path 65 as indicated by one-dotted chain lines in FIG. 3.

As illustrated in FIG. 3, a bundle of four ink tubes 32 and a flexible flat cable 33 extend from the carriage 23.

The four ink tubes 32 connect the recording head 39 to the ink tanks 100. Each of the ink tubes 32 is configured to supply ink (an example of liquid) stored in each of four ink tanks 100B, 100Y, 100C, 100M (these ink tanks may be collectively referred to as "ink tanks 100") to the recording head 39. Specifically, the four ink tubes 32 including ink tubes 32B, 32Y, 32C, 32M (these ink tubes may be collectively referred to as "ink tubes 32") extend from the ink tanks 100B, 100Y, 100C, 100M, respectively, so that ink of respective four colors (black, yellow, cyan and magenta) can flow through the corresponding ink tubes 32 from the corresponding ink tanks 100. These four ink tubes 32 are bundled and connected to the carriage 23.

The flexible flat cable 33 is configured to establish electrical connection between a control board (not illustrated) and the recording head 39. A controller (not illustrated) is surface-mounted on the control board to control operations of the multi-function peripheral 10. The flexible flat cable 84 is configured to transmit control signals outputted from the controller to the recording head 39.

As illustrated in FIG. 2, the recording head 39 is mounted on the carriage 23. The recording head 39 has a lower surface including a plurality of nozzles 40. Each nozzle 40 has a tip end exposed to an outside through the lower surface of the recording head 39. The recording head 39 is configured to eject ink as minute ink droplets from the nozzles 40. As the carriage 23 reciprocates in the leftward/rightward direction 9, the recording head 39 ejects ink droplets, through the nozzles 40, onto the sheet 12 supported by the platen 42. In this way, an image is recorded on each sheet 12, and the ink stored in each of the ink tanks 100B, 100Y, 100C and 100M is consumed.

[Platen 42]

As illustrated in FIG. 2, the platen 42 is disposed between the conveying rollers 54 and the discharging rollers 55 at the conveying path 65. The platen 42 is positioned to oppose the recording portion 24 in the upward/downward direction 7, with the conveying path 65 interposed between the platen 42 and the recording portion 24. The platen 42 supports the sheet 12 conveyed by the conveying rollers 54 from below.

[Cover 70]

As illustrated in FIG. 1B, an opening 22 is formed in a right end portion of the front wall 14A of the housing 14. A cover 70 is assembled to the housing 14 so as to be capable of covering the opening 22. The cover 70 is pivotally movable between a closed position (a position illustrated in FIG. 1A) for closing the opening 22 and an open position (a position illustrated in FIG. 1B) for exposing the opening 22 to the outside.

As illustrated in FIG. 1A, when the cover 70 is at the closed position illustrated in FIG. 1A, a second sleeve 162 (see FIGS. 1B and 4) of each ink tank 100 is shut off from the outside. When the cover 70 is at the open position illustrated in FIG. 1B, the second sleeve 162 of each ink tank 100 is exposed to the outside. As illustrated in FIG. 1A, the cover 70 is formed with an opening 97. Inside the housing 14, an internal void space is provided rearward of the opening 22. The ink tanks 100 are positioned in this internal space. Incidentally, the cover 70 may not be provided.

[Ink Tanks 100]

Figure 4:
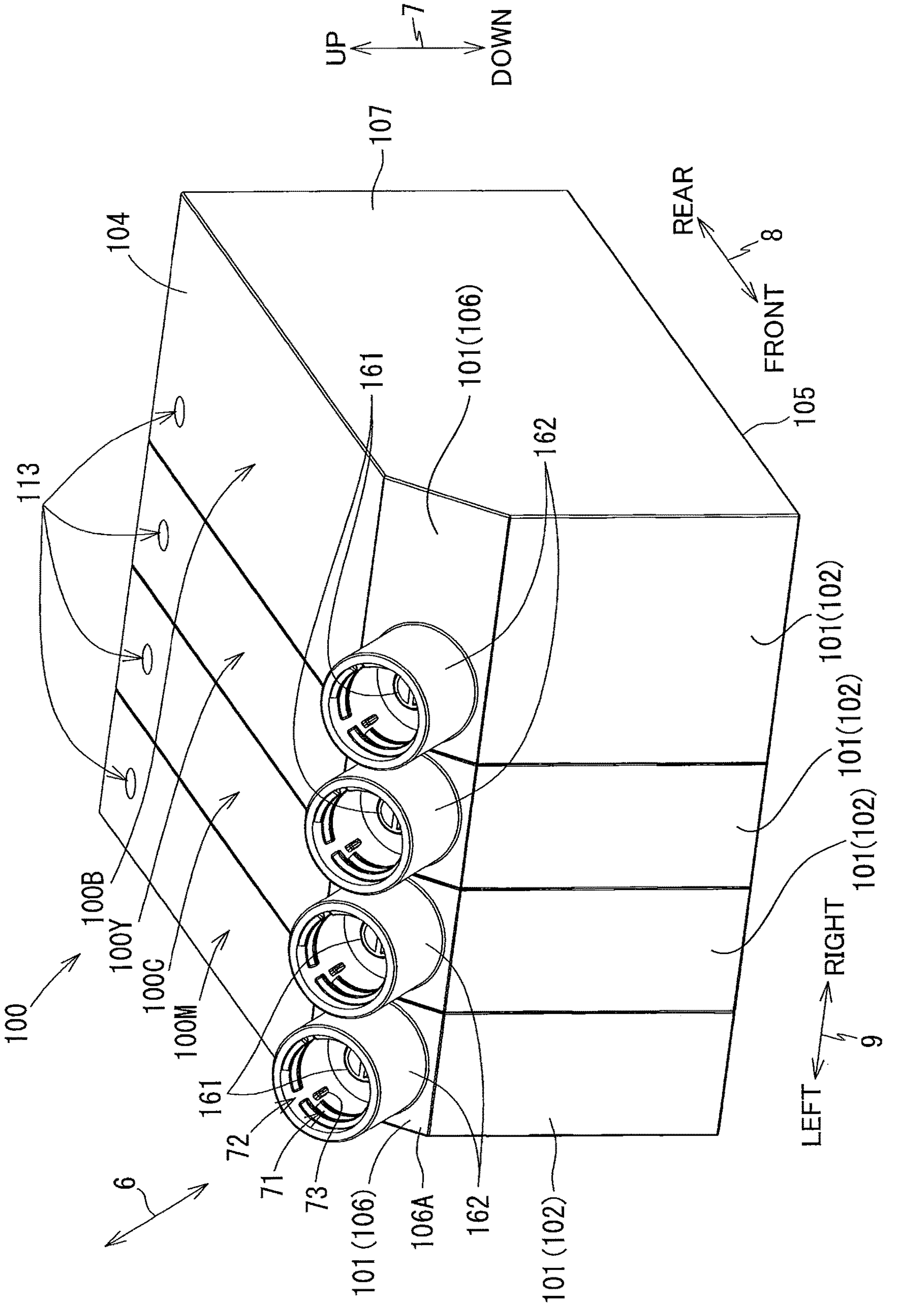
FIG. 4 is a perspective view illustrating the ink tanks 100 in the multifunction peripheral according to the embodiment.

The ink tanks 100 illustrated in FIG. 4 are positioned in the printer portion 11. The ink tanks 100 are used for supplying ink to the recording portion 24 of the printer portion 11. The ink tanks 100 are configured of the four ink tanks 100B, 100Y, 100C, and 100M.

Ink of different colors are stored in the respective ink tanks 100. Specifically, black ink is stored in the ink tank 100B, yellow ink is stored in the ink tank 100Y, cyan ink is stored in the ink tank 100C, and magenta ink is stored in the ink tank 100M. However, numbers of the ink tanks 100 and colors of ink are not limited to those of this embodiment.

Each of the ink tanks 100B, 100Y, 100C and 100M has a generally similar configuration except that a length in the leftward/rightward direction 9 of the ink tank 100B is greater than that of each of the remaining ink tanks 100Y, 100C and 100M. Hence, in the following description, a detailed configuration of the ink tank 100M will be described, while configurations of the ink tanks 100B, 100Y and 100C will be omitted to avoid duplicating description. Still however, configurations of the second sleeves 162 of the respective ink tanks 100B, 100Y, 100C and 100M are different from one another, as will be described later.

Figure 5:
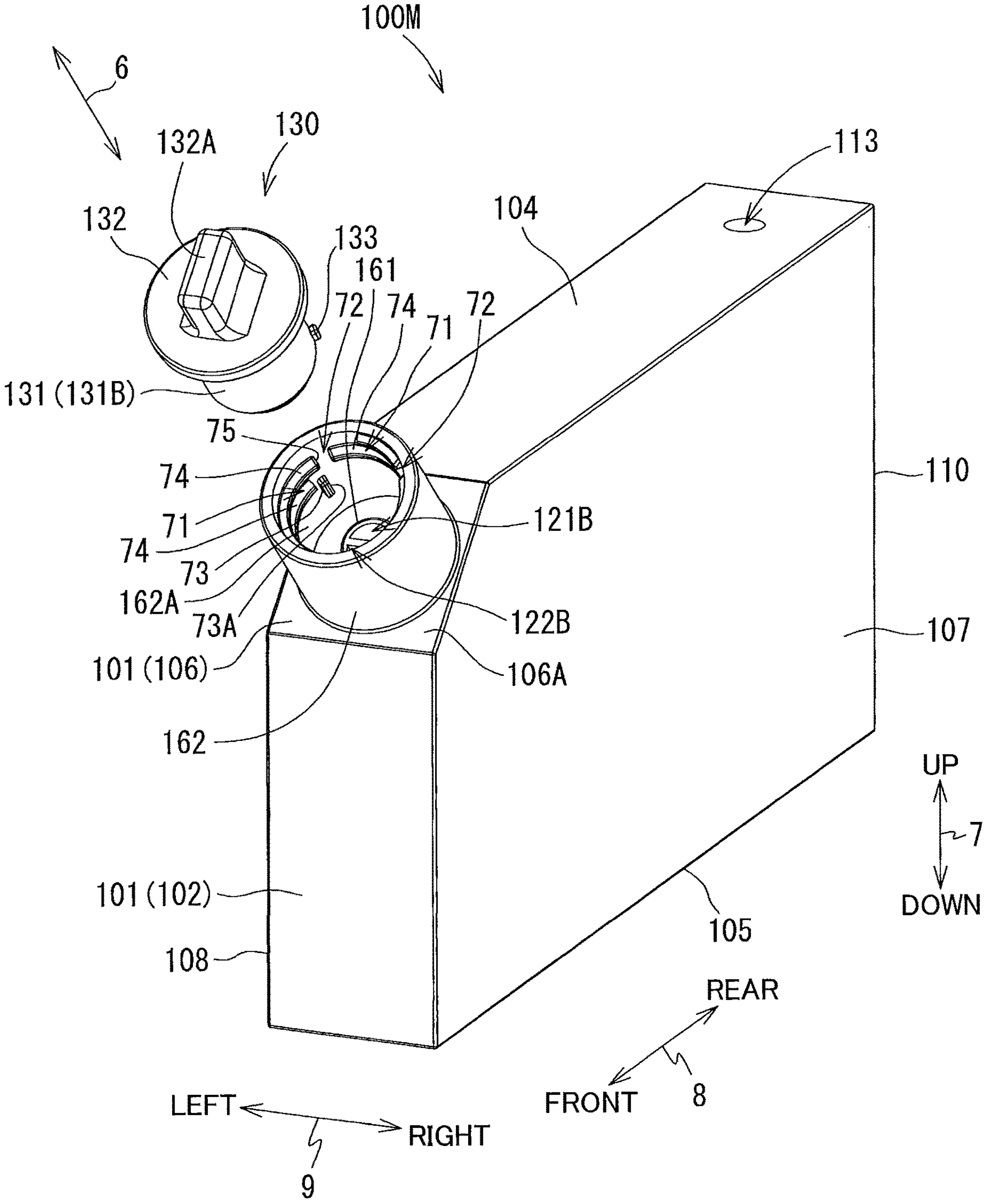
FIG. 5 is a perspective view illustrating an ink tank 100M of the ink tanks 100 in the multifunction peripheral according to the embodiment.

As illustrated in FIG. 5, the ink tank 100M includes a frame (as an example of a casing) configured of a front wall 101, a rear wall 110, an upper wall 104, a lower wall 105, a right wall 107, and a left wall 108. The front wall 101, the rear wall 110, the upper wall 104, and the lower wall 105 are made from resin. The right wall 107 and the left wall 108 are made from films.

The film as the right wall 107 is adhered to a right open end face defined by right end faces of the front wall 101, the rear wall 110, the upper wall 104, and the lower wall 105. The film as the left wall 108 is adhered to a left open end face defined by left end faces of the front wall 101, the rear wall 110, the upper wall 104, and the lower wall 105. The above described resin and the films constitute the frame defining an outer shape of the ink tank 100M. Further, the front wall 101, the rear wall 110, the upper wall 104, the lower wall 105, the right wall 107, and the left wall 108 define an ink chamber 111 (see FIG. 6) as an example of a storage chamber.

Incidentally, whether each wall of the frame is made of resin or film is not limited to that of the above-described embodiment. For example, only the rear wall 110 may be formed of a film, and remaining walls may be made from resin. Alternatively, a part of the right wall 107 may be made from resin, and a remaining part of the right wall 107 may be formed of a film. Further alternatively, a part of the left wall 108 may be made from resin, and a remaining part of the left wall 108 may be formed of a film.

The resin part of the frame is integrally molded by, for example, injection molding with a translucent resin, for example, polypropylene, so that a user can visually confirm the ink stored in the ink chamber 111 of each ink tank 100 from outside thereof.

As illustrated in FIG. 1A, the front wall 101 of each ink tank 100 is exposed to the outside of the multifunction peripheral 10 through the opening 97 of the cover 70 and the opening 22 of the housing 14. The front walls 101 are visible from a front side of the multifunction peripheral 10. A user can recognize a residual amount of ink stored in each ink chamber 111 through the corresponding front wall 101 when observing rearward at the front side of the multifunction peripheral 10.

Figure 6:
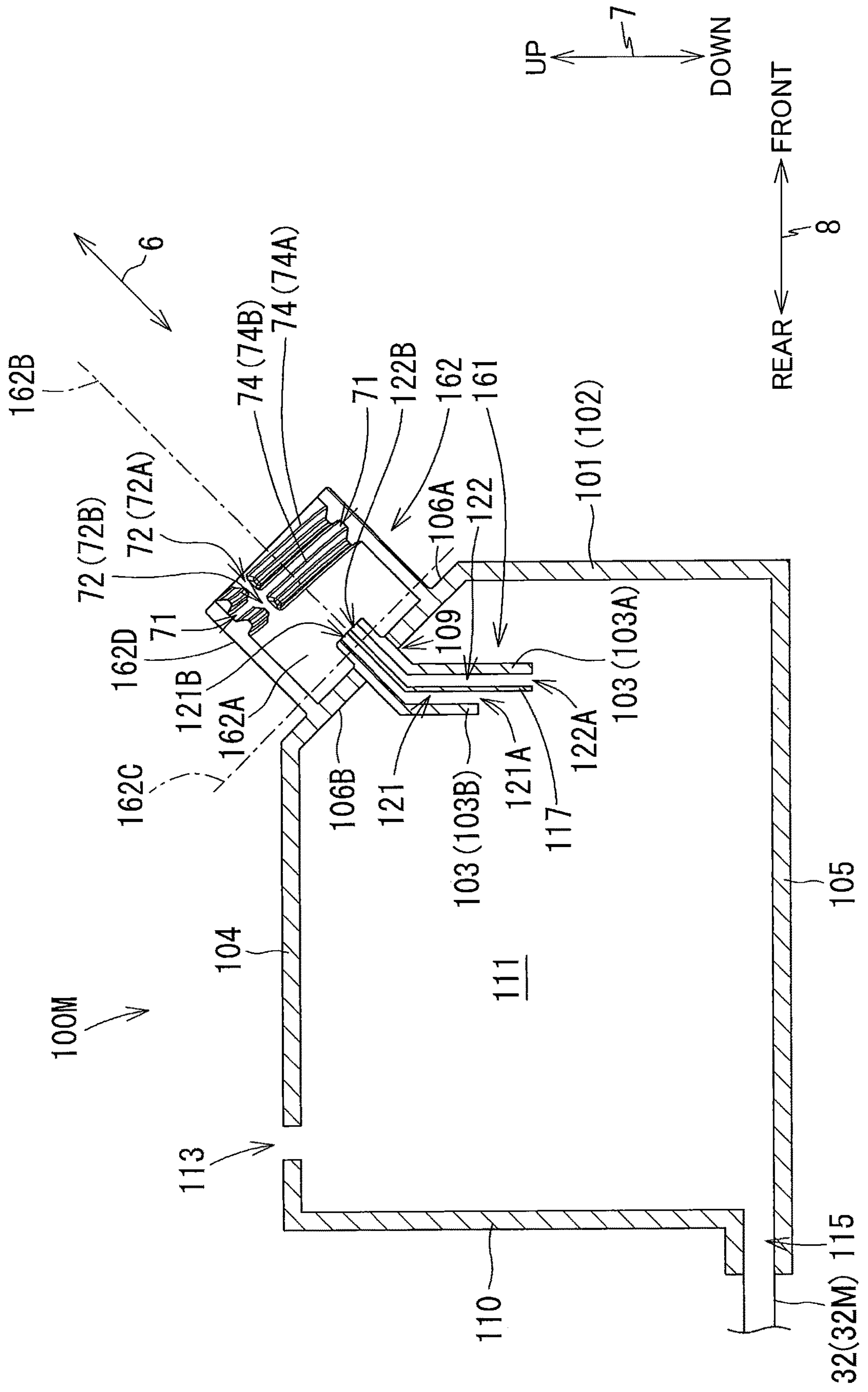
FIG. 6 is a vertical cross-sectional view illustrating the ink tank 100M in the multifunction peripheral according to the embodiment.

As illustrated in FIGS. 5 and 6, the front wall 101 includes an upright wall 102 and an inclined wall 106. The upright wall 102 extends in the upward/downward direction 7 and the leftward/rightward direction 9. The inclined wall 106 spans from an upper end of the upright wall 102 to a front end of the upper wall 104. The inclined wall 106 is inclined with respect to the upward/downward direction 7 and the frontward/rearward direction 8.

The ink tank 100M is formed with an air communication hole 113 (an example of an air communicating portion and an air communication opening). In the depicted embodiment, the air communication hole 113 is formed in the upper wall 104. However, the air communication hole may be formed in the wall other than the upper wall 104. The air communication hole 113 allows the ink chamber 111 to communicate with an atmosphere outside of the ink tank 100M.

As illustrated in FIG. 6, the air communication hole 113 and the ink chamber 111 are directly communicated with each other. Alternatively, the air communication hole 113 and the ink chamber 111 may be communicated with each other through an air communication passage. Further, a semipermeable membrane may be provided somewhere in the air communication passage connecting the ink chamber 111 to the air communication hole 113. The semipermeable membrane is a porous membrane having minute pores that allows air to pass therethrough but prevents liquid from passing therethrough. In this example, the air communication hole 113, the air communication passage, and the semipermeable membrane are examples of the air communicating portion, and the air communication hole 113 is an example of the air communication opening.

As illustrated in FIG. 6, the ink tank 100M is formed with an ink outlet opening 115 for discharging the ink stored in the ink chamber 111. The ink outlet opening 115 is formed in the rear wall 110. The ink tube 32(32M) is connected to the ink outlet opening 115. As illustrated in FIG. 3, the ink stored in the ink chamber 111 is supplied to the recording head 39 through the ink outlet opening 115 and the ink tube 32. Incidentally, the ink outlet opening 115 may be formed in the wall other than the rear wall 110, such as the lower wall 105.

[First Sleeve 161]

As illustrated in FIGS. 4 through 7, the ink tank 100M includes a first sleeve 161. The first sleeve 161 is integral with the frame of the ink tank 100M. As illustrated in FIG. 6, the first sleeve 161 includes an outer portion positioned outside of the frame of the ink tank 100M. The outer portion protrudes diagonally upward and frontward from an outer surface 106A of the inclined wall 106.

Alternatively, the first sleeve 161 may be assembled to the frame of the ink tank 100M. In this case, for example, the first sleeve 161 may have a flange portion protruding radially outwardly from an outer peripheral surface of the first sleeve 161. The first sleeve 161 may be inserted into a through-hole 109 (see FIG. 6) formed in the inclined wall 106, so that the flange portion abuts on the outer surface 106A of the inclined wall 106 to regulate the insertion position of the first sleeve 161.

Incidentally, the second sleeve 162 described later in detail protrudes diagonally upward and frontward from the outer surface 106A and surrounds the outer portion of the first sleeve 161.

Specifically, the first sleeve 161 and the second sleeve 162 protrude in a protruding direction 6 crossing the frontward/rearward direction 8 (horizontal direction) and the upward/downward direction 7 (vertical direction). In other words, the first sleeve 161 and the second sleeve 162 protrude in the direction containing horizontal component and vertical component. The protruding direction 6 also coincides with an axial direction of the first sleeve 161 and the second sleeve 162.

Figure 13:
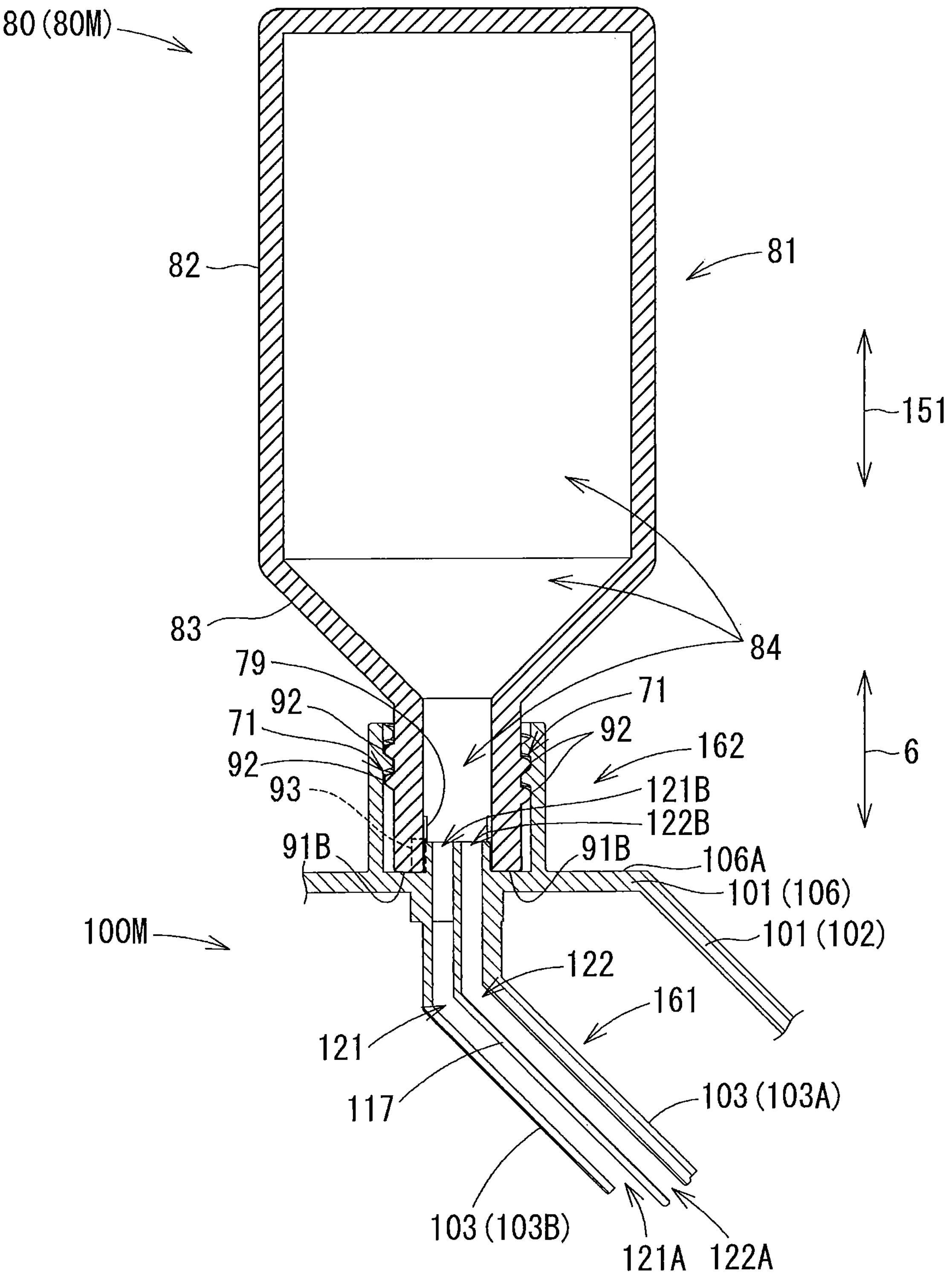
FIG. 13 is a vertical cross-sectional view illustrating the liquid bottle 80M and the portion of the ink tank 100M, and particularly illustrating a connection state between the liquid bottle 80M and the ink tank 100M.

In the present embodiment, the first and second sleeves 161, 162 are inclined by an angle of approximately 45 degrees with respect to the horizontal direction. The first and second sleeves 161, 162 are connectable to an outer sleeve 91 (described later) of a liquid bottle 80 (described later), as illustrated in FIG. 13. Hence, ink stored in the liquid bottle 80 can be supplied into the ink chamber 111.

The outer portion of the first sleeve 161 is generally hollow cylindrical. Incidentally, the shape of the first sleeve 161 is not limited to the hollow cylindrical shape, but can be any tubular shape such as polygonal tube, for example, a square tube.

The first sleeve 161 includes an inner portion positioned inside the frame of the ink tank 100M (in the ink chamber 111). The inner portion extends downward from an inner surface 106B of the inclined wall 106. The inner portion includes an outer wall part 103 including a front wall part 103A and a rear wall part 103B. The front wall part 103A has a lowermost end positioned lower than a lowermost end of the rear wall part 103B.

The first sleeve 161 also includes a partition wall 117 positioned in an inner space of the first sleeve 161. The partition wall 117 partitions the inner space into two different spaces: an air passage 121 and a liquid passage 122.

The air passage 121 is a space defined by the rear wall part 103B and the partition wall 117. The air passage 121 is an example of a first tubular portion. The air passage 121 has an inner end as an opening 121A, and has an outer end as an opening 121B.

The liquid passage 122 is a space defined by the front wall part 103A and the partition wall 117. The liquid passage 122 is an example of a second tubular portion. The liquid passage 122 has an inner end as an opening 122A, and has an outer end as an opening 122B. The liquid passage 122 is positioned below and frontward of the air passage 121.

The openings 121A and 122A are positioned in the ink chamber 111. The opening 121A is open downward at the lowermost end of the rear wall part 103B in the ink chamber 111. The opening 122A is open downward at the lowermost end of the front wall part 103A in the ink chamber 111. That is, the opening 121A is positioned higher than the opening 122A. The openings 121A and 122A are positioned lower than the air communication hole 113.

Incidentally, in a case where the air communication portion is constituted by the air communication hole 113 and the air communication passage, the openings 121A and 122A may be positioned below a portion of the air communication portion.

The openings 121B and 122B are positioned outside of the ink chamber 111. The opening 121B provides communication between the ink chamber 111 and the outside of the ink tank 100M through the air passage 121. The opening 122B provides communication between the ink chamber 111 and the outside of the ink tank 100M through the liquid passage 122. The opening 121B is positioned upward and rearward of the opening 122B.

Incidentally, the air passage 121 and the liquid passage 122 may extend in a direction different from the protruding direction 6 illustrated in FIG. 6. For example, the air passage 121 in its entirety and the liquid passage 122 in its entirety may extend in the upward/downward direction 7. In the latter case, the first sleeve 161 and the second sleeve 162 may be provided at the upper wall 104 to extend in the upward/downward direction 7.

Further, in a case where the first sleeve 161 is assembled to the frame of the ink tank 100M, i.e., in case where the first sleeve 161 is provided as a separate member from the frame of the ink tank 100M, the air passage 121 and liquid passage 122 may be not integral with the frame of the ink tank 100M, but also provided as separate members from the tank of the ink tank 100M.

[Second Sleeve 162]

As illustrated in FIG. 5, the ink tank 100M also includes the second sleeve 162 as an example of a sleeve portion. The second sleeve 162 is integral with the frame of the ink tank 100M in the present embodiment.

Figure 7:
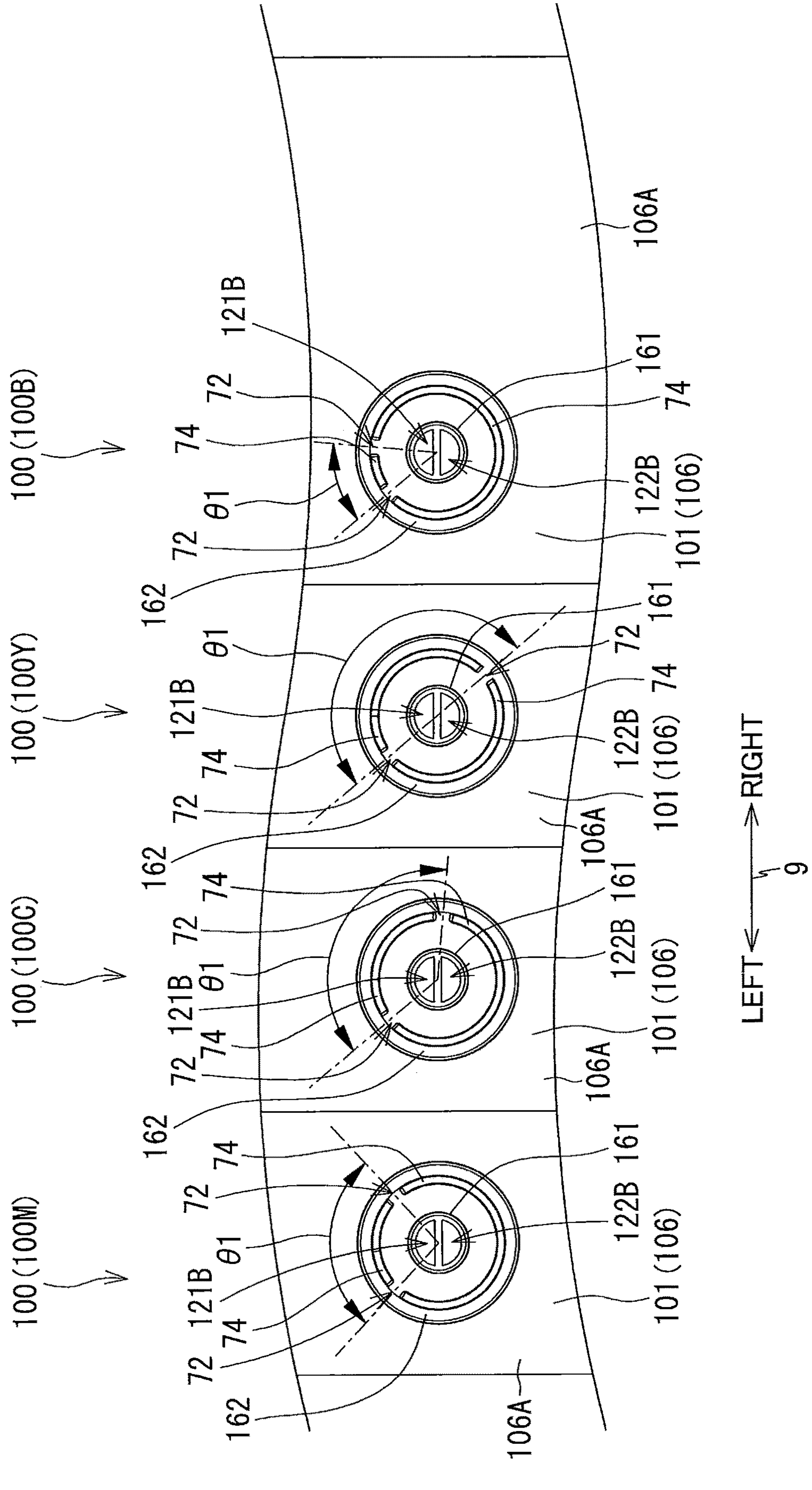
FIG. 7 is a view illustrating a first sleeve 161 and a second sleeve 162 of each of an ink tank 100B, an ink tank 100Y, an ink tank 100C, and the ink tank 100M as viewed in a protruding direction 6 from a tip end to a base end of the sleeves 161 and 162.

As illustrated in FIGS. 5 and 6, the second sleeve 162 protrudes diagonally upward and frontward from the outer surface 106A at a position surrounding the first sleeve 161. The second sleeve 162 surrounds the outer portion of the first sleeve 161, the outer portion protruding diagonally upward and frontward from the outer surface 106A. That is, as illustrated in FIG. 7, the second sleeve 162 surrounds the first sleeve 161 as viewed in the protruding direction 6.

In other words, as illustrated in FIG. 6, in a cross-section 162C perpendicular to a center axis 162B (passing through a center of the first sleeve 161 and a center of the second sleeve 162 and extending in the axial direction of the first sleeve 161 and the second sleeve 162), the first sleeve 161 is positioned radially inward of an outer peripheral surface 162D of the second sleeve 162 (i.e., inside of an outermost profile of the second sleeve 162). As illustrated in FIG. 5, the second sleeve 162 is generally hollow cylindrical. The second sleeve 162 protrudes from the outer surface 106A by a protruding length that is greater than a protruding length by which the first sleeve 161 protrudes from the outer surface 106A.

The second sleeve 162 has an inner peripheral surface 162A provided with a female screw portion 71 (an example of a first screw portion), two concave portions 72 (an example of a first engagement portion), and a convex portion 73 (an example of a regulating portion). The inner peripheral surface is an example of a peripheral surface.

The female screw portion 71 protrudes from the inner peripheral surface 162A and extends helically in a form of a thread 74, thereby forming a helical groove.

The concave portions 72 are formed in the thread 74. As illustrated in FIG. 5. Each of the concave portions 72 is formed at an exposure position where the concave portion 72 is visible by the user from the outside of the ink tank 100M. That is, the user can visually recognize the concave portions 72 when viewed in the protruding direction 6 from the outside of the ink tank 100M. Specifically, the concave portions 72 are positioned near a tip end (upper end) of the second sleeve 162 on the inner peripheral surface 162A.

Incidentally, the concave portions 72 may be at positions other than near the tip end of the second sleeve 162. For example, the concave portions 72 may be positioned near a base end of the second sleeve 162, or may be positioned offset from the thread 74. Alternatively, the concave portions 72 may be positioned not only in the thread 74 but also at a portion offset from the thread 74. Further alternatively, the concave portions 72 may be at such positions that the user cannot observe the concave portions 72 from the outside of the ink tank 100M.

As illustrated in FIGS. 5 and 6, the thread 74 is segmentalized into a plurality of thread sections by the concave portions 72. Each concave portion 72 is formed to extend in the protruding direction 6 from one end of the thread 74 in the protruding direction 6 (the end closer to the tip end of the second sleeve 162 in the protruding direction 6) to another end of the thread 74 in the protruding direction 6 (the end closer to the base end of the second sleeve 162 in the protruding direction 6).

As illustrated in FIG. 6, the thread 74 of the present embodiment has two turns including a first turn 74A and a second turn 74B in the protruding direction 6. Each of the concave portions 72 is configured of: a first concave portion 72A formed in the first turn 74A; and a second concave portion 72B formed in the second turn 74B. The first concave portion 72A and the second concave portion 72B are arranged in line in the protruding direction 6.

As illustrated in FIG. 7, each of the ink tanks 100B, 100Y, 100C and 100M has the two concave portions 72. The ink tanks 100B, 100Y, 100C and 100M respectively provide positional different relationships of the two concave portions 72 from one another. Specifically, the two concave portions 72 of the ink tank 100B define a center angle θ1 of 45 degrees therebetween about the center of the second sleeve 162. The two concave portions 72 of the ink tank 100Y define a center angle θ1 of 180 degrees therebetween about the center of the second sleeve 162. The two concave portions 72 of the ink tank 100C define a center angle θ1 of 135 degrees therebetween about the center of the second sleeve 162. And, the two concave portions 72 of the ink tank 100M define a center angle θ1 of 90 degrees therebetween about the center of the second sleeve 162. Of course, the center angles θ1 are not limited to these angles.

Incidentally, not less than three concave portions 72 may be formed. Further, the ink tanks 100B, 100Y, 100C and 100M may have different numbers of the concave portions 72 from one another, respectively. Further, the ink tanks 100B, 100Y, 100C and 100M each may have the concave portions 72 whose size and shape are different from each other.

As illustrated in FIG. 5, the convex portion 73 is positioned adjacent to one end of the thread 74 in a helical direction thereof. This end in the helical direction of the thread 74 will be referred to as a "base end" of the thread 74, which is the end positioned closer to the base end of the second sleeve 162 than another end in the helical direction of the thread 74 is to the base end of the second sleeve 162. The convex portion 73 extends toward the first sleeve 161 (toward the base end of the second sleeve 162) and is positioned closer to the first sleeve 161 than the base end of the thread 74 is to the first sleeve 161. The convex portion 73 has a protruding length in a radial direction of the second sleeve 162 (in a direction perpendicular to the axial direction of the second sleeve 162 and to the inner peripheral surface 162A of the second sleeve 162) not more than protruding lengths of the thread 74 and a male screw portion 92 described later in the radial direction of the second sleeve 162.

The convex portion 73 is provided at approximately the same position as one of the concave portions 72 in a circumferential direction of the second sleeve 162 (in a direction along the inner peripheral surface 162A of the second sleeve 162). More specifically, the convex portion 73 has one surface 73A and an opposite surface in the circumferential direction, and the thread 74 has an end face 75 forming the one of the concave portions 72. The one surface 73A and the end face 75 are positioned on an identical imaginary plane extending along the protruding direction 6. The one surface 73A is a surface farther from the base end of the thread 74 than the opposite surface is from the base end of the thread 74 in the circumferential direction of the second sleeve 162.

Incidentally, the convex portion 73 may have a shape different from the shape illustrated in FIG. 5. For example, the surface 73A of the convex portion 73 may be inclined with respect to the protruding direction 6 such that the surface 73A approaches the base end of the thread 74 as extending toward the tip end of the second sleeve 162 in the protruding direction 6. Further, the convex portion 73 may be omitted.

[Liquid Bottle 80]

Figure 8:
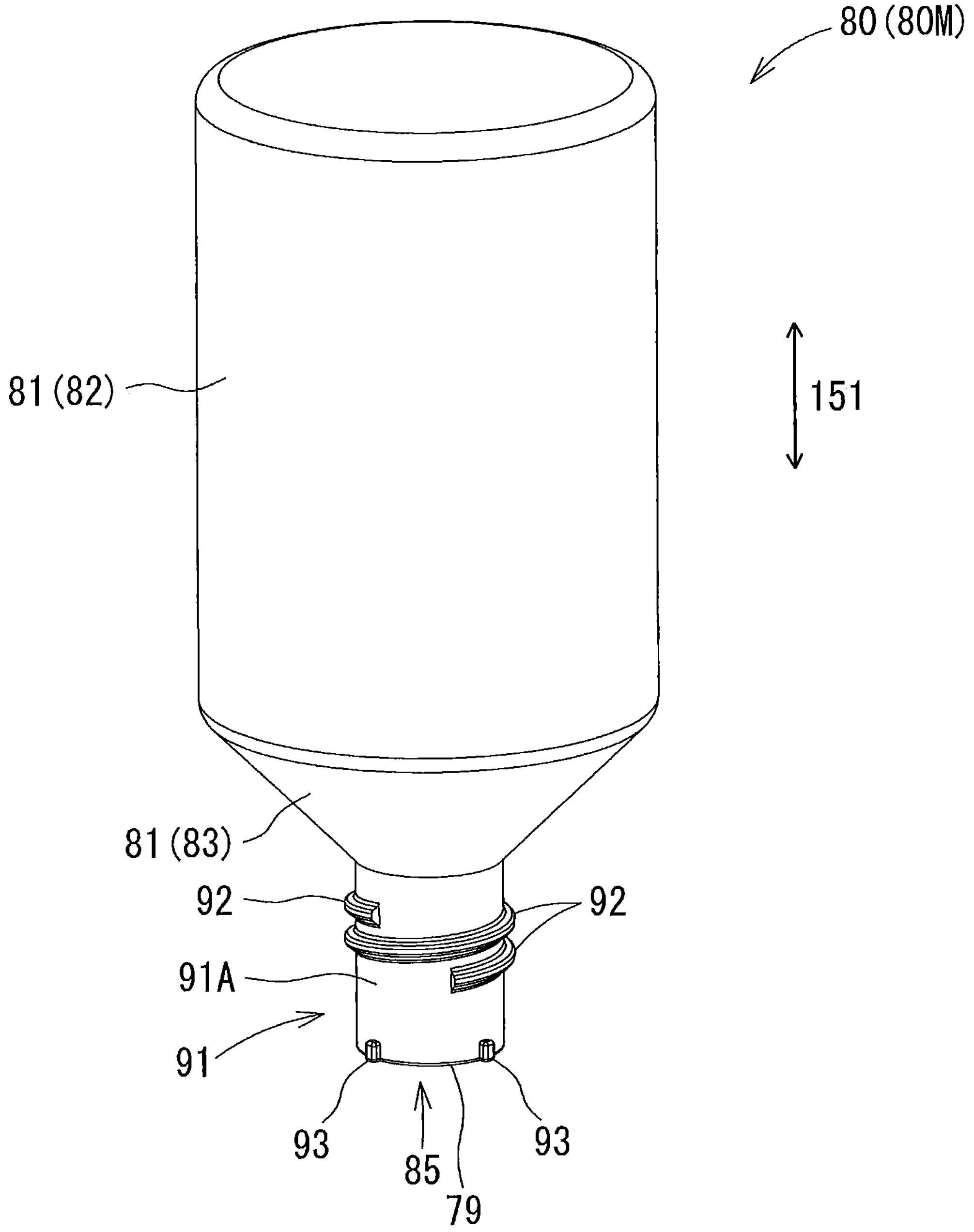
FIG. 8 is a perspective view illustrating a liquid bottle 80M in the multifunction peripheral according to the embodiment.

The liquid bottle 80 illustrated in FIG. 8 is connectable to the corresponding ink tank 100, and is generally hollow cylindrical. As illustrated in FIGS. 10 through 13, the liquid bottle 80 is a container providing an internal space 84 in which ink is stored.

Liquid bottles 80B, 80Y, 80C and 80M are provided in one-to-one correspondence with the ink tanks 100B, 100Y, 100C and 100M (these liquid bottles may be collectively referred to as "liquid bottles 80", wherever appropriate). The liquid bottles 80B, 80Y, 80C, 80M respectively contain ink of different colors corresponding to the ink tanks 100B, 100Y, 100C and 100M. That is, the liquid bottle 80B (FIG. 9D) contains black ink and is associated with the ink tank 100B; the liquid bottle 80Y (FIG. 9C) contains yellow ink and is associated with the ink tank 100Y; the liquid bottle 80C (FIG. 9B) contains cyan ink and is associated with the ink tank 100C; and the liquid bottle 80M (FIG. 9A) contains magenta ink and is associated with the ink tank 100M.

In the present embodiment, the liquid bottles 80B, 80Y, 80C and 80M have generally similar configurations, regardless of the color of the stored ink. Hence, hereinafter, the configuration of the liquid bottle 80M will be described, while description as to the configurations of the remaining liquid bottles 80B, 80Y and 80C will be omitted for simplifying description.

Note that configurations of the outer sleeves 91 of the liquid bottles 80B, 80Y, 80C, 80M are different from one another. The difference will be described later in detail. Incidentally, the liquid bottles 80B, 80Y, 80C and 80M may be designed to be different from one another in accordance with the colors of the stored ink (for example, in terms of difference in outer shape, difference in labels indicative of ink color, difference in coloration of at least a part of the liquid bottle 80 or a bottle cap 140).

The liquid bottle 80M includes an outer wall 81 and the outer sleeve 91. The outer wall 81 defines therein the internal space 84. The outer wall 81 includes a main body portion 82 and a tapered portion 83. The main body portion 82 has a hollow cylindrical shape. The tapered portion 83 has a frusto-conical shape. The tapered portion 83 is tapered such that a diameter thereof is gradually reduced with increasing the distance from the main body portion 82 in an axial direction 151 (i.e., a longitudinal direction of the main body portion 82) of the liquid bottle 80M.

The outer sleeve 91 is hollow cylindrical. The outer sleeve 91 extends from a tip end of the tapered portion 83 in the axial direction 151. The tip end of the tapered portion 83 is opposite to a base end of the tapered portion 83 connected to the main body portion 82. The outer sleeve 91 has a tip end opposite to the tapered portion 83. The tip end of the outer sleeve 91 has a supply opening 85 that is open to the outside of the liquid bottle 80M. The internal space 84 of the liquid bottle 80M is communicable with the outside of the liquid bottle 80M through the supply opening 85. As will be described later, the outer sleeve 91 is connectable to the first sleeve 161 and the second sleeve 162 of the ink tank 100M.

A seal 79 made from elastic material such as rubber is bonded to a tip end face 91B (FIG. 13) of the outer sleeve 91. The seal 79 is an example of a valve. The supply opening 85 is closed by the seal 79. The seal 79 is formed with slits in a form of cruciform shape, for example. The seal 79 can maintain a sealing state in a state where no external force is applied to the seal 79.

The slits maintain the cruciform shape in the sealing state of the seal 79, so that the internal space 84 of the liquid bottle 80M is shut off from the outside. On the other hand, the seal 79 can be an open state upon receiving an external force from the outside, i.e., upon abutment of the first sleeve 161 against the seal 79. The seal 79 is pushed and wound around the slits by the application of external force to the seal 79, i.e., by the pushing force of the first sleeve 161 against the seal 79, so that the internal space 84 of the liquid bottle 80M becomes communicated with the outside.

The seal 79 may not necessarily be bonded to the tip end face 91B of the outer sleeve 91. For example, the seal 79 may be bonded to an inner peripheral surface of the outer sleeve 91 at a position deeper than the tip end face 91B (farther away from the tip end of the outer sleeve 91) in the axial direction 151.

Further, the structure for opening and closing the supply opening 85 is not limited to the seal 79. For example, a duckbill type valve may be provided at the tip end face 91B of the outer sleeve 91. Alternatively, a movable valve may be provided in the internal space 84 of the liquid bottle 80M. In the latter case, the movable valve may be internally urged by a spring to be in intimate contact with a surface forming the supply opening 85 to close the supply opening 85 in a state where no external force is applied to the movable valve. On the other hand, the movable valve may be moved away from the surface forming the supply opening 85 against the urging force of the spring by the pushing force from the first sleeve 161 moving into the internal space 84. Hence, the supply opening 85 is opened. At this time, the valve is at the opening state.

The outer sleeve 91 has an outer peripheral surface 91A provided with a male screw portion 92, and a pair of convex portions 93. The outer peripheral surface 91A is an example of a peripheral surface. The male screw portion 92 is an example of a second screw portion. The convex portion 93 is an example of a second engagement portion.

The male screw portion 92 is constituted by a thread protruding from the outer peripheral surface 91A and extending helically. The outer sleeve 91 has an outer diameter that is approximately equal to an inner diameter of the second sleeve 162 of the ink tank 100M. The male screw portion 92 is threadingly engageable with the female screw portion 71 of the second sleeve 162.

The convex portions 93 are positioned at a tip end portion of the outer sleeve 91. The convex portions 83 are positioned closer to the tip end of the outer sleeve 91 than the male screw portion 92 is to the tip end. Each of the convex portions 93 has a protruding length in a radial direction of the outer sleeve 91 (in a direction perpendicular to the axial direction 151 of the outer sleeve 91 and to the outer peripheral surface 91A of the outer sleeve 91) not more than a protruding length of the male screw portion 92 in the radial direction of the outer sleeve 91.

Positions and shapes of the convex portions 93 of the liquid bottle 80M correspond to those of the concave portions 72 of the ink tank 100M. In the same manner, positions and shapes of the convex portions 93 of the liquid bottle 80B correspond to those of the concave portions 72 of the ink tank 100B. Positions and shapes of the convex portions 93 of the liquid bottle 80Y correspond to those of the concave portions 72 of the ink tank 100Y. Positions and shapes of the convex portions 93 of the liquid bottle 80C correspond to those of the concave portions 72 of the ink tank 100C.

Figure 9A:
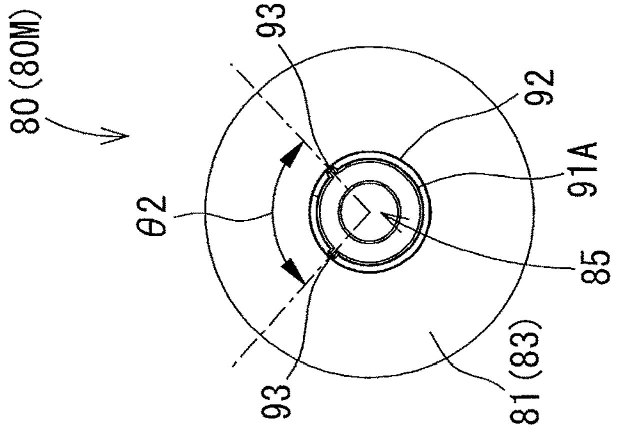
FIGS. 9A through 9D are views illustrating outer sleeves 91 of the liquid bottle 80M, a liquid bottle 80C, a liquid bottle 80Y and a liquid bottle 80B as viewed in an axial direction thereof from a tip end to a base end of the respective liquid bottles 80.
Figure 9B:
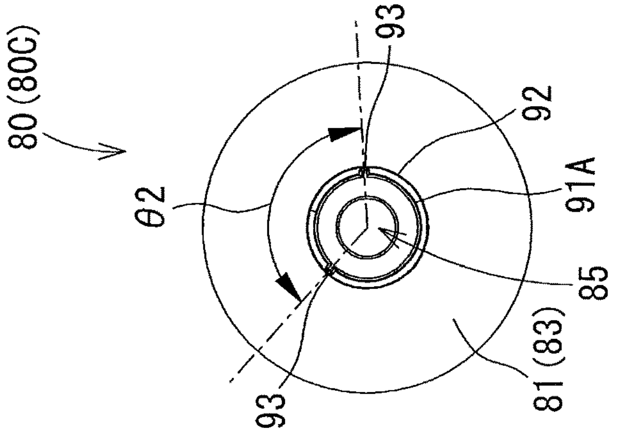
Figure 9C:
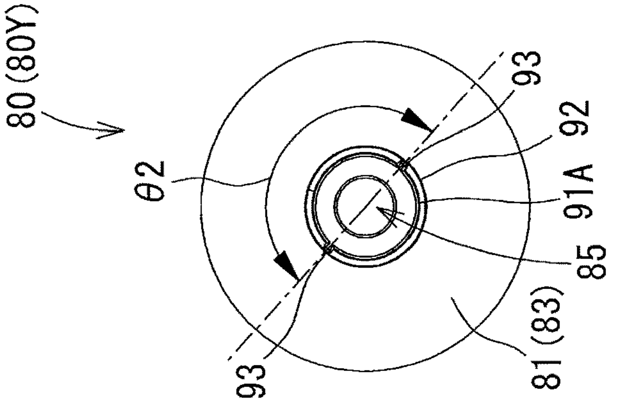
Figure 9D:
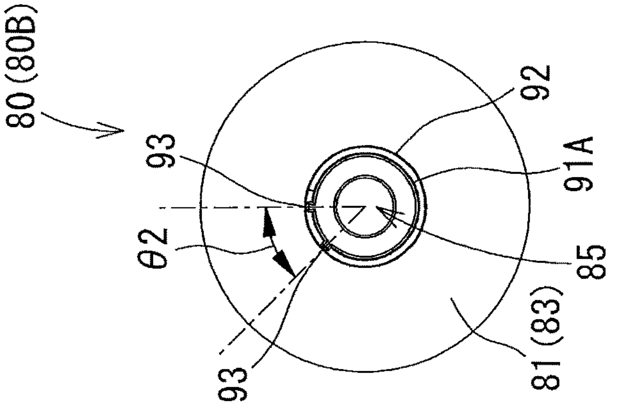

That is, according to the present embodiment, as illustrated in FIGS. 9A through 9D, two convex portions 93 are provided in each of the liquid bottles 80B, 80Y, 80C and 80M. Positional relationship between the two convex portions 93 of each of the liquid bottles 80B, 80Y, 80C and 80M is different from one another. In the present embodiment, center angles θ2 defined by the two convex portions 93 of the liquid bottle 80B, 80Y, 80C and 80M are 45 degrees (as illustrated in FIG. 9D), 180 degrees (as illustrated in FIG. 9C), 135 degrees (as illustrated in FIG. 9B), and 90 degrees (as illustrated in FIG. 9A), respectively.

Incidentally, values of the center angles θ2 and shapes of the convex portions 93 of the respective liquid bottles 80 are not limited to the above described examples, as long as these match the values of the center angles θ1 and the shapes of the concave portions 72 of the corresponding ink tanks 100. Further, numbers of the convex portions 93 may not be limited to the above-described numbers, provided that the numbers are greater than one.

[Connection of Liquid Bottle 80 to Ink Tank 100]

The liquid bottles 80 are connected to the corresponding ink tanks 100. That is, the liquid bottle 80B is connected to the ink tank 100B; the liquid bottle 80Y is connected to the ink tank 100Y; the liquid bottle 80C is connected to the ink tank 100C; and the liquid bottle 80M is connected to the ink tank 100M. In the following description, a process to connect the liquid bottle 80M to the ink tank 100M will be described.

Figure 10:
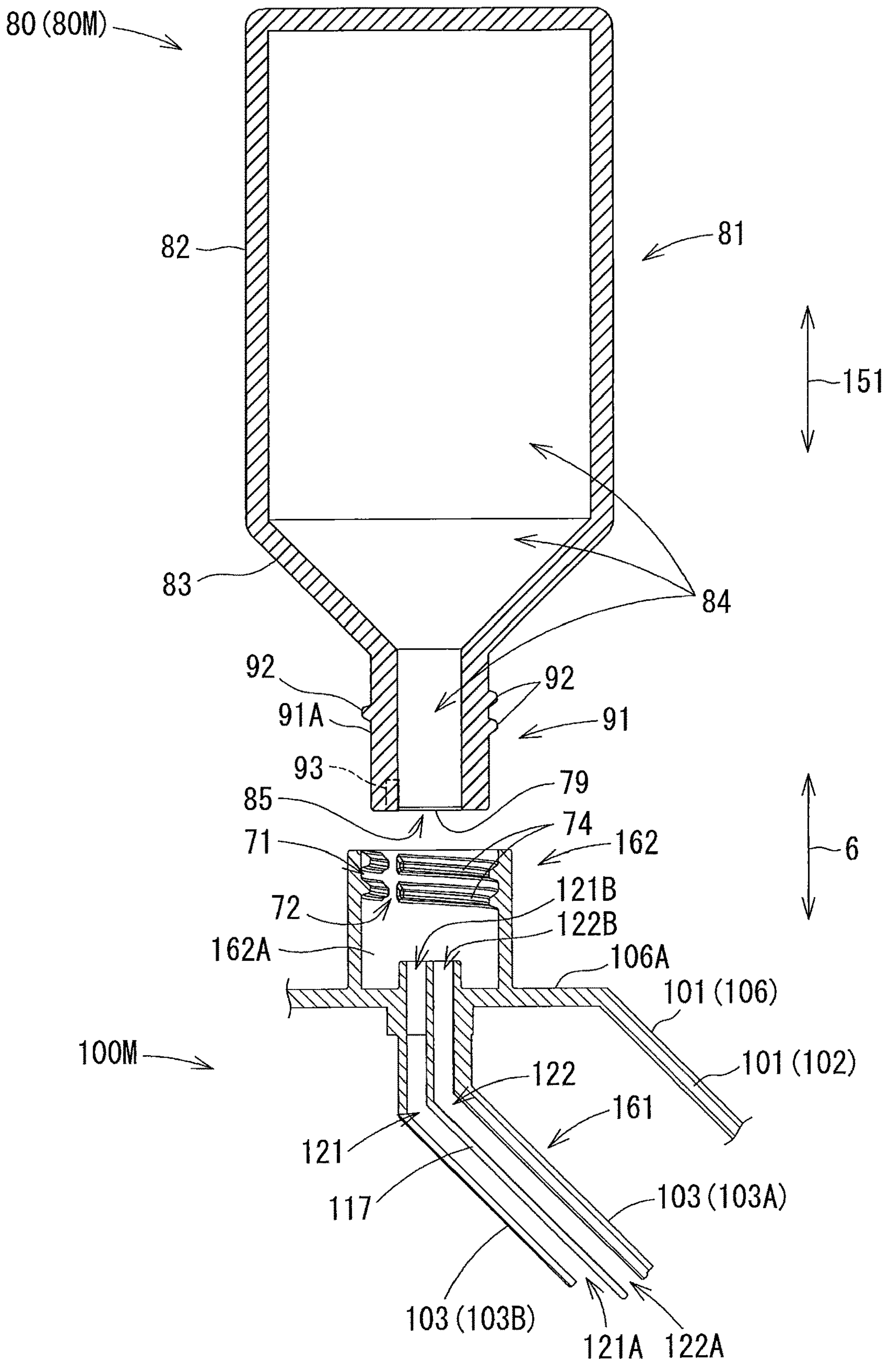
FIG. 10 is a vertical cross-sectional view illustrating the liquid bottle 80M and a portion of the ink tank 100M, the portion including the second sleeve 162, and particularly illustrating a state where the outer sleeve 91 is not yet inserted in the second sleeve 162.

As illustrated in FIG. 10, for the connection of the liquid bottle 80M to the ink tank 100M, the supply opening 85 of the outer sleeve 91 is brought closer to the first sleeve 162 and the second sleeve 162 in the protruding direction 6, while alignment between the supply opening 85 and the first and second sleeves 161 and 162 in the protruding direction 6 is maintained.

Incidentally, in the process of the connection of the liquid bottle 80M to the ink tank 100M (in the states illustrated in FIGS. 10 through 13), the axial direction of the outer sleeve 91 (the axial direction 151 of the liquid bottle 80M) is coincident with the axial direction of the first sleeve 161 and the second sleeve 162. That is, the axial direction of the outer sleeve 91 (the axial direction 151 of the liquid bottle 80M) is coincident with the protruding direction 6.

Figure 11:
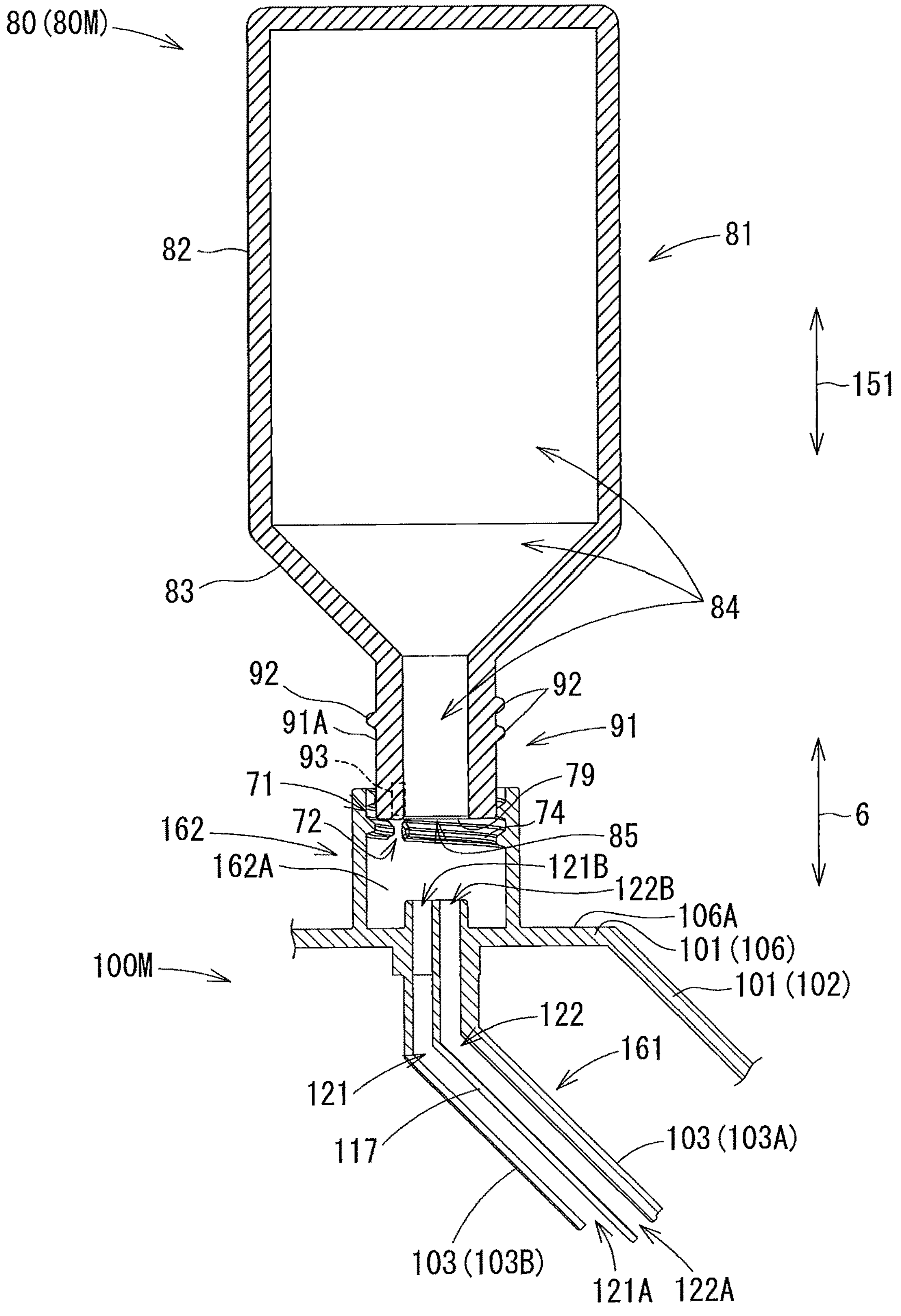
FIG. 11 is a vertical cross-sectional view illustrating the liquid bottle 80M and the portion of the ink tank 100M, and particularly illustrating a state where the outer sleeve 91 is inserted into the second sleeve 162, and convex portions 93 of the liquid bottle 80M is guided by concave portions 72 of the ink tank 100M.

As illustrated in FIG. 11, as the outer sleeve 91 is inserted into the second sleeve 162 in the protruding direction 6, the convex portions 93 enter into the corresponding concave portions 72 of the second sleeve 162. As described above, the positions and shapes of the convex portions 93 of the liquid bottle 80M correspond to those of the concave portions 72 of the ink tank 100M. Hence, the convex portions 93 of the liquid bottle 80M enter into the corresponding concave portions 72 of the ink tank 100M and are guided relative to the concave portions 72 in the protruding direction 6, i.e., in the direction of the center axis 162B (see FIG. 6).

In other words, a user holds the liquid bottle 80M to allow the two convex portions 93 of the liquid bottle 80M to be entered into the two concave portions 72 of the second sleeve 162, and inserts the outer sleeve 91 of the liquid bottle 80M into the second sleeve 162. Here, moving in the direction of the center axis 162B means movement along the center axis 162B in both directions (toward the upper-front and toward the lower-rear). In the state illustrated in FIG. 11, the male screw portion 92 is not yet threadingly engaged with the female screw portion 71, since the male screw portion 92 is still located outside of the second sleeve 162.

Similarly, for the connection of the liquid bottle 80B to the ink tank 100B, the concave portions 72 of the ink tank 100B permit the convex portions 93 of the liquid bottle 80B to be guided and entered in the protruding direction 6. For the connection of the liquid bottle 80Y to the ink tank 100Y, the concave portions 72 of the ink tank 100Y permit the convex portions 93 of the liquid bottle 80Y to be guided and entered in the protruding direction 6. For the connection of the liquid bottle 80C to the ink tank 100C, the concave portions 72 of the ink tank 100C permit the convex portions 93 of the liquid bottle 80C to be guided and entered in the protruding direction 6.

On the other hand, in a case where connection of the liquid bottle 80M to the ink tanks 100 other than the ink tank 100M (i.e., connection to the ink tank 100B, 100Y or 100C) is contemplated, the convex portions 93 of the liquid bottle 80M are prevented from being guided by the concave portions 72 of the ink tank 100B, 100Y or 100C in the protruding direction 6. This is because the positional relationship between the concave portions 72 of the ink tank 100B, 100Y, 100C is different from the positional relationship between the convex portions 93 of the liquid bottle 80M. Hence, even if insertion of the liquid bottle 80M into any one of the ink tanks 100B, 100Y and 100C in the protruding direction 6 is contemplated, the convex portions 93 of the liquid bottle 80M abut against the thread 74 of the ink tank 100B, 100Y or 100C. Accordingly, insertion of the outer sleeve 92 of the liquid bottle 80M into the second sleeve 162 of the ink tank 100B, 100Y or 100C is prevented.

Similarly, in a case where the connection of the liquid bottle 80B to the ink tank 100M, 100Y or 100C those other than the ink tank 100B is contemplated, the concave portions 72 of the ink tank 100M, 100Y or 100C do not permit the convex portions 93 to be guided and entered in the protruding direction 6. Further, in a case where the connection of the liquid bottle 80Y to the ink tank 100B, 100M or 100C those other than the ink tank 100Y is contemplated, the concave portions 72 of the ink tank 100B, 100M or 100C do not permit the convex portions 93 to be guided and entered in the protruding direction 6. In a case where the connection of the liquid bottle 80C to the ink tank 100B, 100Y or 100M those other than the ink tank 100C is contemplated, the concave portions 72 of the ink tank 100B, 100Y or 100M do not permit the convex portions 93 to be guided and entered in the protruding direction 6.

Here, assume that the multifunction peripheral 10 is provided with only one single ink tank 100. If a liquid bottle 80 is to be connected to the single ink tank 100, the concave portions 72 of the single ink tank 100 permit the convex portions 93 of the liquid bottle 80 to be guided along the concave portions 72 in the protruding direction 6. On the other hand, here, assume that there is another kind of multifunction peripheral provided with a single ink tank having concave portions whose configurations are different from those of the concave portions 72 of the ink tank 100 of the multifunction peripheral 10. If the liquid bottle 80 is attempted to be connected to the single ink tank of the other kind of multifunction peripheral, the concave portions cannot receive the convex portions 93 of the liquid bottle 80. That is, the concave portions of the other kind of multifunction peripheral do not guide movement of the convex portions 93 of the liquid bottle 80 in the protruding direction 6.

Figure 12:
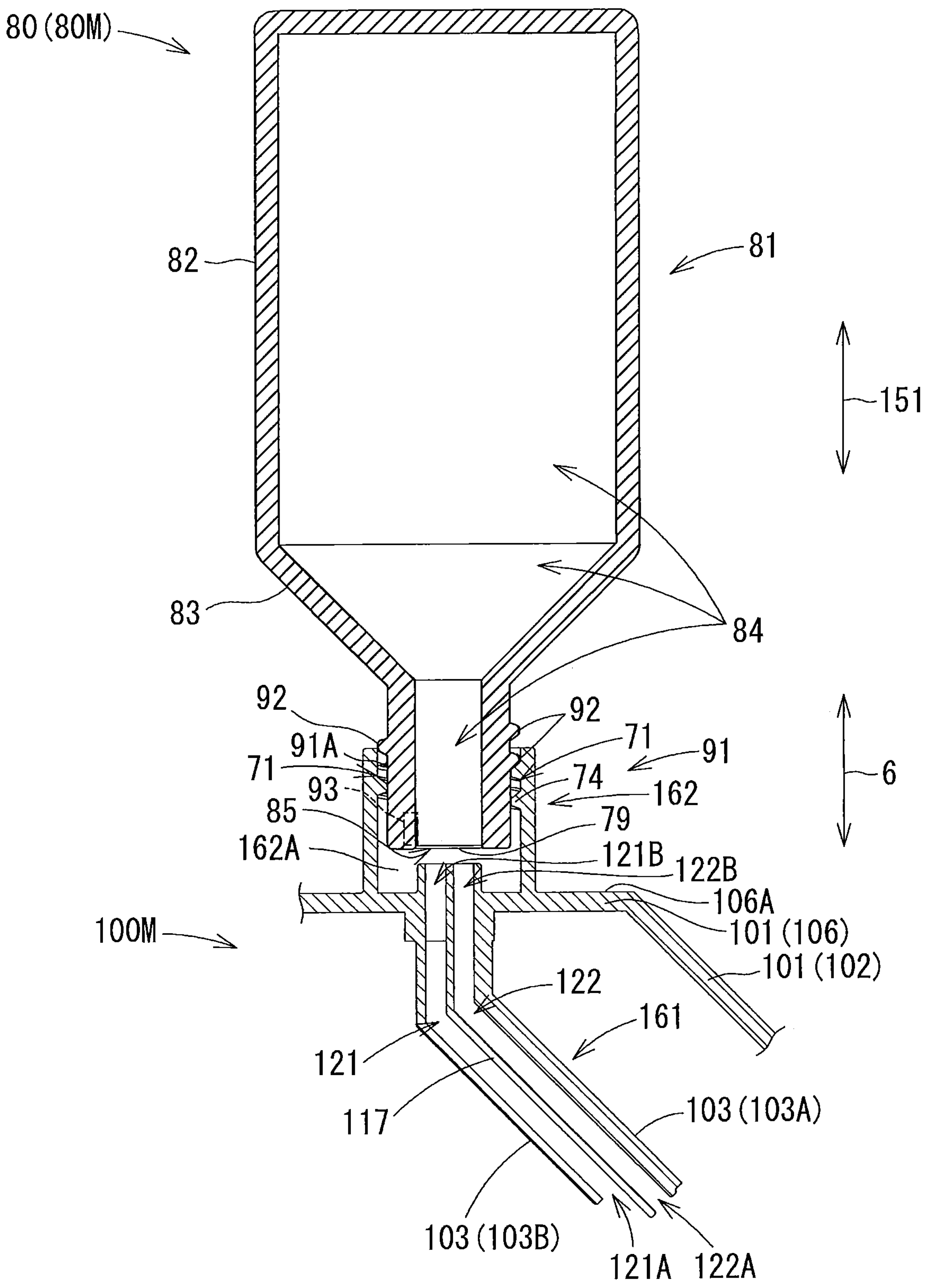
FIG. 12 is a vertical cross-sectional view illustrating the liquid bottle 80M and the portion of the ink tank 100M, and particularly illustrating a state where the outer sleeve 91 is inserted into the second sleeve 162, and a male screw portion 92 of the liquid bottle 80M is being threadingly engaged with a female screw portion 71 of the ink tank 100M.

In accordance with further insertion of the outer sleeve 91 into the second sleeve 162 from the state illustrated in FIG. 11, the convex portions 93 move past the concave portions 72. Then, as illustrated in FIG. 12, the convex portions 93 approach the base end of the second sleeve 162. That is, the convex portions 93 are positioned between the female screw portion 71 and the first sleeve 161 in the protruding direction 6. Further, the male screw portion 92 is brought into threading engagement with the female screw portion 71. That is, in the present embodiment, the threading engagement between the male screw portion 92 and the female screw portion 71 is started after the concave portions 72 guide the movement of the convex portions 93 in the process of connecting the outer sleeve 91 to the second sleeve 162.

Thereafter, as the user rotates the liquid bottle 80M in a clockwise direction, the threading engagement between the male screw portion 92 and the female screw portion 71 is promoted. That is, as a result of further advancing movement of the outer sleeve 91 into the second sleeve 162 from the state illustrated in FIG. 12, the first sleeve 161 is brought into abutment with the seal 79 of the outer sleeve 91 as illustrated in FIG. 13, and the first sleeve 161 pushes the seal 79. Hence, the seal 79 is wound along the slits to provide the open state of the seal 79. That is, during the process of connection of the outer sleeve 91 to the second sleeve 162, the seal 79 changes from its closed state to its open state as a result of the abutment thereof with the first sleeve 161 after the male screw portion 92 and the female screw portion 71 are threadingly engaged with each other.

The open state of the seal 79 causes the supply opening 85 to be opened. The first sleeve 151 enters into the interior of the outer sleeve 91 through the opened supply opening 85. Hence, the internal space 84 of the liquid bottle 80M is in communication with the ink chamber 111 of the ink tank 100M through the opening 121B and the opening 122B. The state illustrated in FIG. 13 is a connection state between the liquid bottle 80M and the ink tank 100M. In the connection state, the tip end face 91B (to which the seal 79 is bonded) of the outer sleeve 91 is seated on the outer surface 106A of the ink tank 100M.

For detaching the liquid bottle 80M from the ink tank 100M, that is, in a process to disconnect the outer sleeve 91 from the second sleeve 162, the liquid bottle 80M is rotated in a counterclockwise direction. Hence, the threading engagement between the male screw portion 92 and the female screw portion 71 is gradually released while the liquid bottle 80M is moved away from the ink tank 100M. In accordance with the movement of the liquid bottle 80M, the seal 79 is first separated from the first sleeve 161. Thus, the seal 79 is unwound around the slits to restore the closed state. Thereafter, the male screw portion 92 is disengaged from the female screw portion 71.

After disengagement of the male screw portion 92 from the female screw portion 71, the convex portions 93 are brought into abutment against the thread 74 from the side near the base end of the second sleeve 162 in the protruding direction 6, thereby preventing the liquid bottle 80M from detaching from the ink tank 100M. At this time, the liquid bottle 80M is rotated in the counterclockwise direction while being applied with a force urging the liquid bottle 80M to be pulled out from the ink tank 100M. Hence, the convex portions 93 are moved in the circumferential direction of the second sleeve 162 while being guided by the thread 74.

Finally, one of the convex portions 93 abuts against the convex portion 73 of the second sleeve 162. By the abutment, movement of the convex portions 93 in the circumferential direction is restricted. Further, because of this abutment, the convex portions 93 are respectively in alignment with the corresponding concave portions 72 of the second sleeve 162 in the protruding direction 6 (as described above, the one surface 73A of the convex portion 73 is aligned with the end face 75 defining one of the concave portions 72 in the protruding direction 6).

In this state, by the application of the pull-out force to the liquid bottle 80M, the liquid bottle 80M is moved in a pull-out direction (in the protruding direction 6) relative to the ink tank 100M while the convex portions 93 are guided by the concave portions 72. In this way, the liquid bottle 80M is removed from the ink tank 100M.

Next, ink supply from the liquid bottle 80M to the ink tank 100M in the connection state illustrated in FIG. 13 will be described.

The internal space 84 of the liquid bottle 80M and the ink chamber 111 are communicated with each other through the air passage 121 and the liquid passage 122, when the openings 121B and 122B of the first sleeve 161 are located in the internal space 84 of the ink bottle 80M as a result of the connection of the liquid bottle 80M to the ink tank 100M. Accordingly, the ink stored in the internal space 84 of the liquid bottle 80M flows along the liquid passage 122 through the opening 122B and into the ink chamber 111 through the opening 122A of the liquid passage 122.

Further, in response to the ink flow into the ink chamber 111, air in the ink chamber 111 of the ink tank 100M flows into the air passage 121 through the opening 121A, and the air is introduced into the internal space 84 of the liquid bottle 80M through the opening 121B of the air passage 121. A volume of the ink flowing from the liquid bottle 80M into the ink chamber 111 of the ink tank 100M is approximately equal to a volume of the air flowing from the ink chamber 111 into the liquid bottle 80M. In this way, so called air/liquid replacement is performed.

Inflow of the ink into the ink chamber 111 causes elevation of a level of the ink in the ink chamber 111. When the level of the ink in the ink chamber 111 rises up to the opening 121A of the air passage 121, air communication between the air passage 121 and the ink chamber 111 is shut off, thereby stopping inflow of the air from the ink chamber 111 to the internal space 84 of the liquid bottle 80M. As a result, inflow of the ink from the internal space 84 of the liquid bottle 80M into the ink chamber 111 is also stopped. Ink replenishment into the ink camber 111 is terminated by the detachment of the liquid bottle 80M from the ink tank 100M.

[Tank Cap 130]

Next, a tank cap 130 will be described with reference to FIG. 14. The tank cap 130 is attachable to and detachable from the second sleeve 162 of the ink tank 100M (see FIG. 5) to close and open the openings 121A and 122A (121B, 122B) of the first and second sleeves 161 and 162.

The tank cap 130 of a specific configuration is provided for each of the ink tanks 100B, 100Y, 100C and 100M. That is, four different tank caps 130 are provided for the multifunction peripheral 10.

Figure 14:
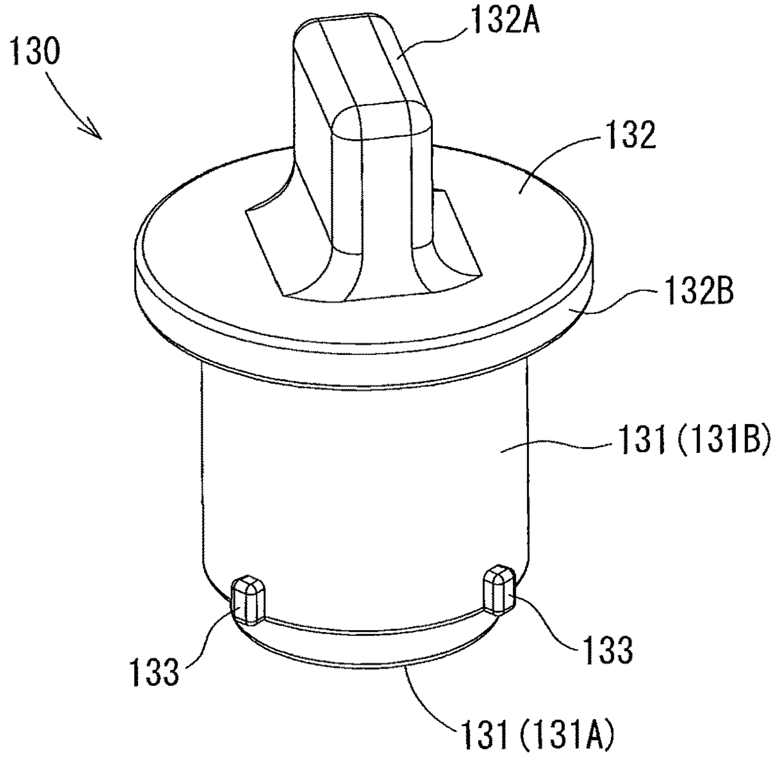
FIG. 14 is a perspective view of a tank cap 130 for the ink tank 100M in the multifunction peripheral according to the embodiment.

As illustrated in FIG. 14, the tank cap 130 includes a main portion 131, a flange portion 132, and convex portions 133 as an example of an engagement portion of the tank cap. The main portion 131 is generally hollow cylindrical. The main portion 131 has a shape and size approximately the same as those of the outer sleeve 91 of the liquid bottle 80M. The main portion 131 has one end and another end 131A in an axial direction thereof.

The flange portion 132 is provided at one end of the main portion 131 in an axial direction of the main portion 131. The flange portion 132 has a diameter greater than an outer diameter of the main portion 131. A knob 132A is provided at the flange portion 132. The knob 132A is gripped by the user for attaching the tank cap 130 to the second sleeve 162. The convex portions 133 are provided at an outer peripheral surface 131B of the main portion 131. The outer peripheral surface 131B is an example of a peripheral surface of the tank cap.

Positions, number, and shape of the convex portions 133 provided at the outer peripheral surface 131B of the main portion 131 with respect to the four different tank caps 130 are different from one another in one-to-one correspondence with the ink tanks 100B, 100Y, 100C and 100M.

That is, positions, number, and shape of the convex portions 133 of the tank cap 130 to be attached to the second sleeve 162 of the ink tank 100B are identical to those of the convex portions 93 provided at the outer peripheral surface 91A of the outer sleeve 91 of the liquid bottle 80B. Further, positions, number, and shape of the convex portions 133 of the tank cap 130 to be attached to the second sleeve 162 of the ink tank 100Y are identical to those of the convex portions 93 provided at the outer peripheral surface 91A of the outer sleeve 91 of the liquid bottle 80Y. Further, positions, number, and shape of the convex portions 133 of the tank cap 130 to be attached to the second sleeve 162 of the ink tank 100C are identical to those of convex portions 93 provided at the outer peripheral surface 91A of the outer sleeve 91 of the liquid bottle 80C. Further, positions, number, and shape of the convex portions 133 of the tank cap 130 to be attached to the second sleeve 162 of the ink tank 100M are identical to those of the convex portions 93 provided at the outer peripheral surface 91A of the outer sleeve 91 of the liquid bottle 80M.

With this structure, the tank cap 130 can be attached to the second sleeve 162 of the corresponding one of the ink tanks 100, because the concave portions 72 properly guides the convex portions 133, respectively. On the other hand, the tank cap 130 cannot be attached to the second sleeve 162 of any one of the remaining three ink tanks 100 (other than the corresponding ink tank 100) because the convex portions 133 cannot be received and guided by the concave portions 72.

The main portion 131 has another end opposite to the one end connected to the flange portion 132 in the axial direction of the main portion 131. An end face 131A of the other end of the main portion 131 is in pressure contact with the first sleeve 161 in a state where the tank cap 130 is attached to the second sleeve 162. The pressure contact between the end face 131A and first sleeve 161 provides liquid-tight sealing to the openings 121B and 122B of the first sleeve 161. That is, the openings 121B and 122B are hermetically sealed. On the other hand, the openings 121B and 122B are open prior to attachment of the tank cap 130 to the second sleeve 162. Incidentally, in an operable state of the multifunction peripheral 10, the liquid bottles 80 are not attached to the respective ink tanks 100. Hence, the second sleeve 162 is plugged by the corresponding tank cap 130 in order to prevent leakage of the ink.

Further, in an attached state of the tank cap 130 to the second sleeve 162, an outer peripheral surface 132B of the flange portion 132 is in pressure contact with the inner peripheral surface 162A of the second sleeve 162. Hence, the interior of the second sleeve 162 is closed off from the atmosphere, and accidental removal of the tank cap 130 from the second sleeve 162 can be avoided.

A male screw (as an example of a third screw portion) threadingly engageable with the female screw portion 71 of the second sleeve 162 may be provided at the outer peripheral surface 131B of the tank cap 130. This male screw may have a structure identical to that of the male screw portion 92 provided at the outer sleeve 91 of the corresponding liquid bottle 80. In the latter case, the female screw portion 71 of the second sleeve 162 can be threadingly engaged with selected one of the male screw portion 92 of the outer sleeve 91 and the male screw of the tank cap 130. Alternatively, the male screw of the tank cap 130 may be different from the male screw portion 92 of the outer sleeve 91 of the corresponding liquid bottle 80. For example, the number of turns of the male screw of the tank cap 130 may be different from the number of turns of the male screw portion 92 of the outer sleeve 91 of the corresponding liquid bottle 80.

[Bottle Cap 140]

Next, the bottle cap 140 will be described with reference to FIG. 15. The bottle cap 140 is attachable to and detachable from the outer sleeve 91 of the liquid bottle 80M (see FIG. 16) to close and open the supply opening 85 of the outer sleeve 91.

The bottle cap 140 of a specific configuration is provided for each of the liquid bottles 80B, 80Y, 80C and 80M. That is, four different bottle caps 140 are provided.

Figure 15:
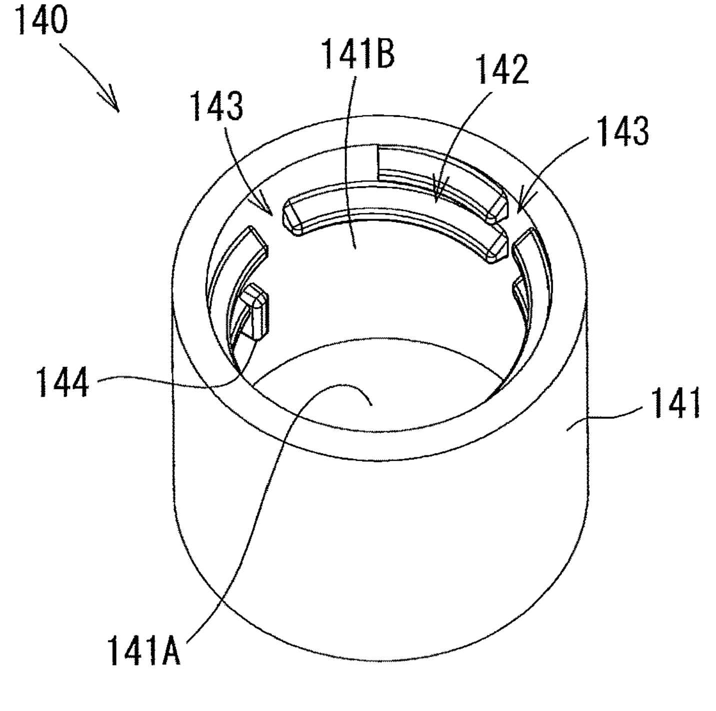
FIG. 15 is a perspective view of a bottle cap 140 for the liquid bottle 80M in the multifunction peripheral according to the embodiment.
Figure 16:
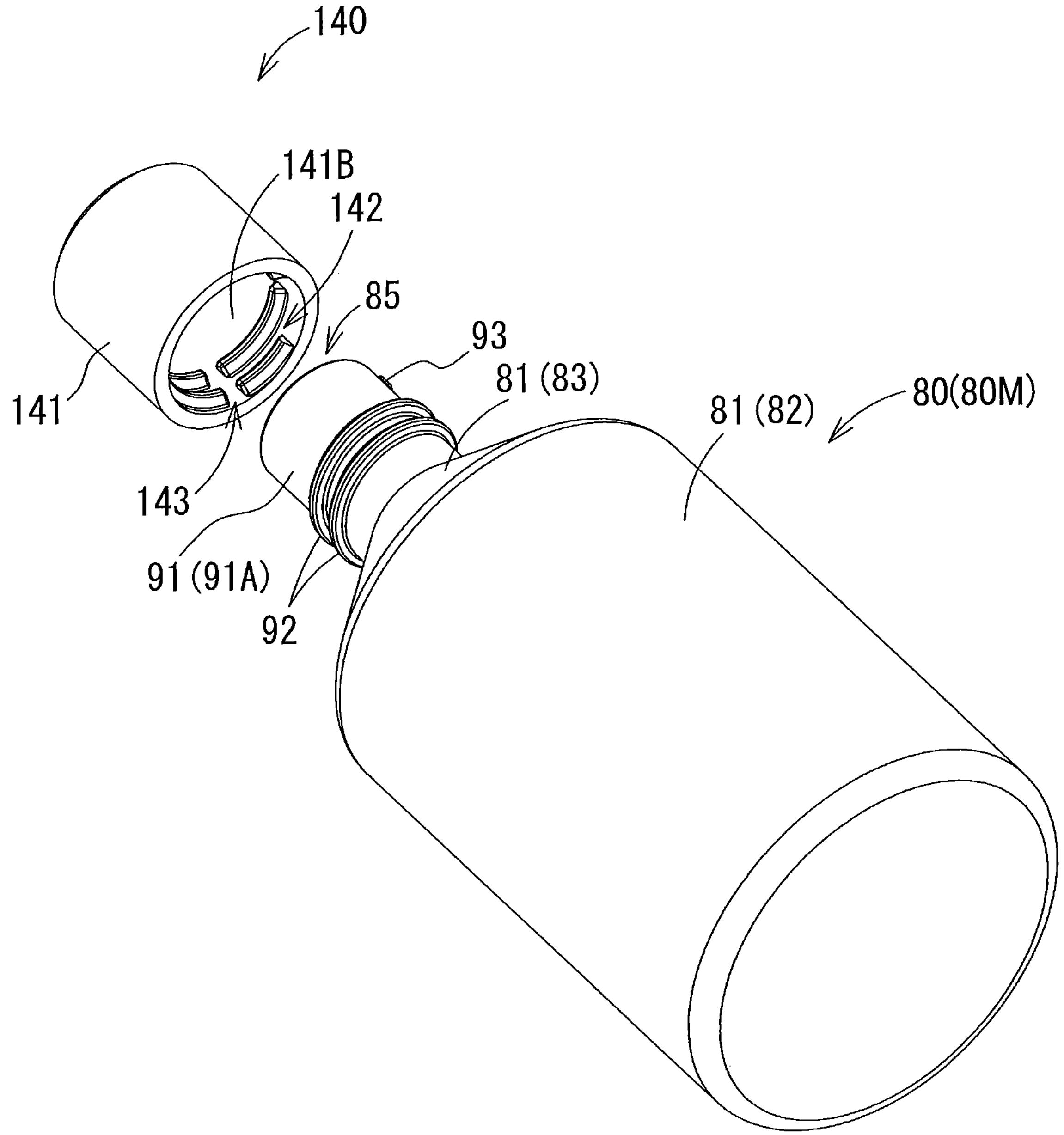
FIG. 16 is a perspective view illustrating the liquid bottle 80M and the bottle cap 140 in the multifunction peripheral according to the embodiment.

As illustrated in FIG. 15, the bottle cap 140 includes a main portion 141, a female screw portion 142 (as an example of a fourth screw portion), concave portions 143 (as an example of an engagement portion of the bottle cap), and a convex portion 144. The main portion 141 is generally hollow cylindrical. The main portion 141 has one end in an axial direction thereof that is closed by an end surface 141A. The main portion 141 has another end in the axial direction thereof which is an open end. The main portion 141 has an inner peripheral surface 141B (as an example of a peripheral surface of the bottle cap) at which the female screw portion 142, the concave portions 143, and the convex portion 144 are provided.

The main portion 141 has a shape and size approximately the same as those of the second sleeve 162 of the ink tank 100M. That is, the inner peripheral surface 141B of the main portion 141 corresponds to the inner peripheral surface 162A of the second sleeve 162.

The female screw portion 142 corresponds to the female screw portion 71 of the second sleeve 162 and has the same configuration as the female screw portion 71. The convex portion 144 corresponds to the convex portion 73 of the second sleeve 162 and has the same configuration as the convex portion 73. Incidentally, the female screw portion 142 may be different from the female screw portion 71 in terms of the number of helical turns.

Positions, number, and shape of the concave portions 143 formed in the inner peripheral surface 141B of the main portion 141 with respect to the four different bottle caps 140 are different from one another in one-to-one correspondence with the liquid bottles 80B, 80Y, 80C and 80M.

Specifically, positions, number, and shape of the concave portions 143 of the bottle cap 140 to be attached to the outer sleeve 91 of the liquid bottle 80B are identical to those of the concave portions 72 formed in the inner peripheral surface 162A of the second sleeve 162 of the ink tank 100B. Likewise, positions, number, and shape of the concave portions 143 of the bottle cap 140 to be attached to the outer sleeve 91 of the liquid bottle 80Y are identical to those of the concave portion 72 formed in the inner peripheral surface 162A of the second sleeve 162 of the ink tank 100Y. Further, positions, number, and shape of the concave portions 143 of the bottle cap 140 to be attached to the outer sleeve 91 of the liquid bottle 80C are identical to those of the concave portions 72 formed in the inner peripheral surface 162A of the second sleeve 162 of the ink tank 100C. Further, positions, number, and shape of the concave portions 143 of the bottle cap 140 to be attached to the outer sleeve 91 of the liquid bottle 80M are identical to those of the concave portions 72 formed in the inner peripheral surface 162A of the second sleeve 162 of the ink tank 100M.

With this structure, the bottle cap 140 can be attached to the outer sleeve 91 of the corresponding liquid bottle 80, because the concave portions 143 properly guide the convex portions 93 of the corresponding liquid bottle 80. On the other hand, the bottle cap 140 cannot be attached to the outer sleeve 91 of any one of the remaining three liquid bottles 80 other than the corresponding liquid bottle 80, because the concave portions 143 cannot guide the convex portions 93 of such incorrect liquid bottles 80.

In a state where the bottle cap 140 is attached to the outer sleeve 91 of the liquid bottle 80M, the seal 79 is covered with the bottle cap 140. Therefore, the seal 79 is prevented from becoming into the open state due to application of external force to the seal 79, so that the supply opening 85 is kept to be closed. On the other hand, the seal 79 is not covered with the bottle cap 140 in a state where the bottle cap 140 is detached from the outer sleeve 91. Therefore, the seal 79 can be into the open state by the application of external force to the seal 79. That is, the supply opening 85 can be open. Incidentally, the outer sleeve 91 is normally capped with the bottle cap 140 in order to avoid leakage of the ink in the detached state of the ink bottle 80 from the corresponding ink tank 100.

Incidentally, the female screw portion 142 and the convex portion 144 may be omitted from the bottle cap 140.

Operational and Technical Advantages of the Embodiment

According to the above-described embodiment, the outer sleeve 91 of the liquid bottle 80(80M) is connected to the first sleeve 161 and the second sleeve 162 of the corresponding ink tank 100(100M) for ink supply from the liquid bottle 80 to the ink tank 100. At this time, the male screw portion 92 of the outer sleeve 91 is threadingly engaged with the female screw portion 71 of the second sleeve 162. Thus, the connection state of the liquid bottle 80 to the ink tank 100 is maintained. Accordingly, ink supply from the liquid bottle 80 to the corresponding ink tank 100 can be performed without the user's gripping of the liquid bottle 80.

Further, according to the embodiment, the concave portions 72 of the ink tank 100M is configured to guide the convex portions 93 of the liquid bottle 80M, but are not configured to guide the convex portions 93 of any one of the liquid bottles 80C, 80Y and 80B. That is, the concave portions 72 of the ink tank 100 are adapted to guide the convex portions 93 of the corresponding liquid bottle 80, but are not adapted to guide the convex portions 93 of any of the liquid bottles 80 other than the corresponding liquid bottle 80. Therefore, attachment of the liquid bottle 80 to any un-matched ink tank 100 is avoidable.

Further, in the embodiment, since the first and second sleeves 161 and 162 extend diagonally upward, the liquid bottle 80 has a slanting posture in the state of connection of the liquid bottle 80 to the ink tank 100. In this connection, if the liquid bottle 80 were not fixed to the ink tank 100, the liquid bottle 80 would be disconnected from the ink tank 100 and dropped down from the ink tank 100 unless the user grips the liquid bottle 80. According to the present embodiment, the liquid bottle 80 can be fixed to the ink tank 100 by way of the threading engagement between the male screw portion 92 of the outer sleeve 91 and the female screw portion 71 of the second sleeve 162. Hence, such inadvertent dropping down of the liquid bottle 80 from the ink tank 100 can be prevented.

Further, according to the embodiment, the seal 79 is changed to the open state after the male screw portion 92 and the female screw portion 71 are at least partially threadingly engaged with each other. Therefore, leakage of the ink out of the liquid bottle 80 prior to the fixing of the liquid bottle 80 to the ink tank 100 can be prevented.

Further, according to the embodiment, eligibility of the liquid bottle 80 to be attached to the ink tank 100 can be determined by visually observing the shape of the concave portions 72 of the ink tank 100. Therefore, there is no need to have uniformity in coloring between the ink tank 100 and the corresponding liquid bottle 80.

Further, according to the embodiment, the second sleeve 162 includes the convex portion 73. During the disconnection process of the outer sleeve 91 from the second sleeve 162, rotation of the outer sleeve 91 to a rotation-stop position thereof provides an in-line array between the convex portion 93 and the concave portion 72 in the axial direction. That is, the convex portion 93 can be guided by the concave portion 72 only by pulling out the outer sleeve 91 in the axial direction. Hence, disconnection of the outer sleeve 91 from the second sleeve 162 can be facilitated.

Further, according to the embodiment, the protruding length of the convex portion 93 is not more than the protruding length of the male screw portion 92. Therefore, complexity in shape of the outer sleeve 91 and the second sleeve 162 due to existence of the convex portion 93 can be restrained. Further, a bulky structure of the first and second sleeves 161 and 162 due to the convex portion 93 can be obviated.

Further, according to the embodiment, the concave portions 72 are formed in the thread 74 which forms the female screw portion 71. Therefore, independent formation of the concave portions 72 and the thread 74 is unnecessary. Hence, simplified shape of the outer sleeve 91 and the second sleeve 162 can be provided.

Further, according to the embodiment, erroneous attachment of the tank cap 130 to any unmatched one of the ink tanks 100 can be prevented.

Further, according to the embodiment, accidental detachment of the tank cap 130 from the second sleeve 162 of the corresponding ink tank 100 can be prevented.

Further, according to the embodiment, erroneous attachment of the bottle cap 140 to any unmatched one of the liquid bottles 80 can be prevented.

Further, according to the embodiment, accidental detachment of the bottle cap 140 from the outer sleeve 91 of the corresponding liquid bottle 80 can be prevented.

Further, according to the embodiment, not only the second sleeve 162 but also the bottle cap 140 can be threadingly engaged with the male screw portion 92 of the outer sleeve 91 of the corresponding liquid bottle 80.

Modification 1

Figure 17:
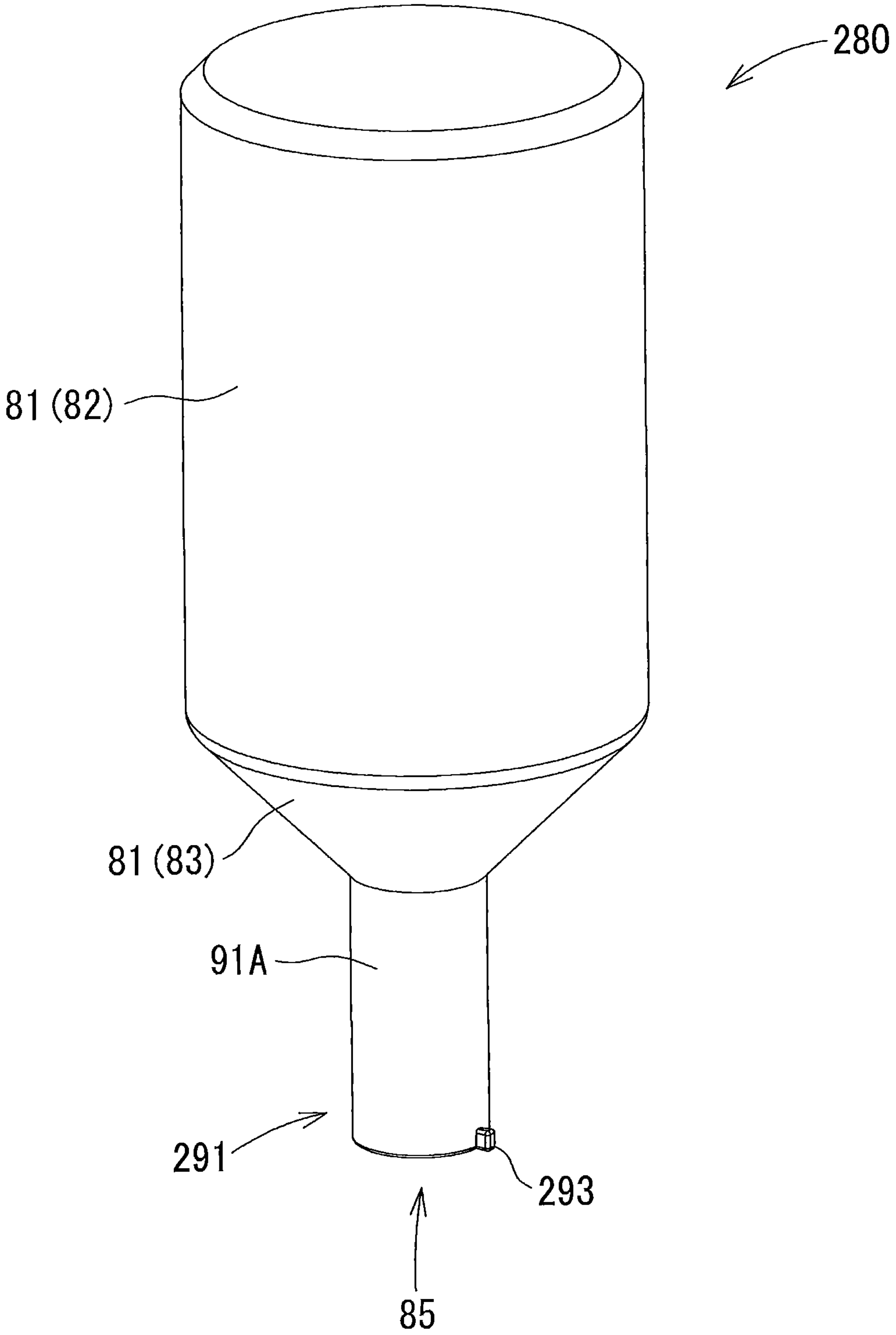
FIG. 17 is a perspective view of a liquid bottle 280 in a multifunction peripheral according to a first modification.
Figure 18:
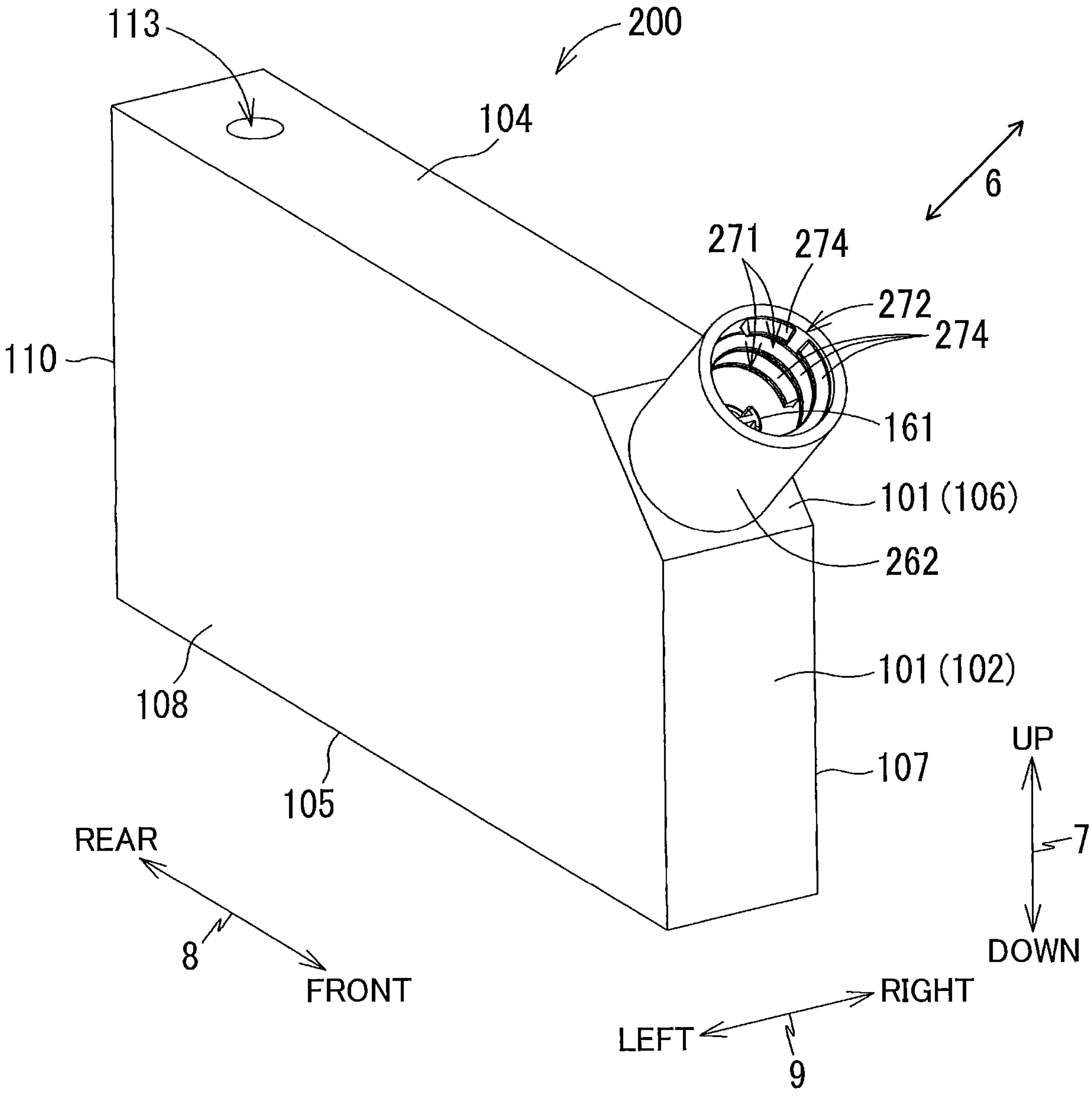
FIG. 18 is a perspective view of an ink tank 200 in the multifunction peripheral according to the first modification.

FIGS. 17 and 18 illustrate a liquid bottle 280 and an ink tank 200 according to a first modification to the embodiment. In the following description and drawings, like parts and components are designated by the same reference numerals as those in the above described embodiment in order to avoid duplicating description.

In the above-described embodiment, the outer sleeve 91 of the liquid bottle 80 includes the male screw portion 92 as the second screw portion and the convex portion 93 as the second engagement portion. However, the outer sleeve 91 may not include the male screw portion 92.

Specifically, in the liquid bottle 280 of the first modification, an outer sleeve 291 does not include the male screw portion 92, but includes a convex portion 293 (instead of the convex portion 93) functioning as the second screw portion as well as the second engagement portion.

As illustrated in FIG. 18, the ink tank 200 of the first modification includes: the first sleeve 161 of the embodiment; and a second sleeve 262 in which a concave portion 272 is formed only in a first turn of a thread 274 constituting a female screw portion 271, the first turn being positioned closest to a tip end of the second sleeve 262. Further, a pitch (interval) of neighboring turns of the thread 274 in the protruding direction 6 is not less than a length of the convex portion 293 in the axial direction of the outer sleeve 291.

For the connection of the liquid bottle 280 to the ink tank 200, firstly, the convex portion 293 is guided by the concave portion 272. Hence, the convex portion 293 is positioned between the neighboring turns of the thread 274. Thereafter, the liquid bottle 280 is rotated in the clockwise direction about an axis thereof extending in the protruding direction 6. Accordingly, the convex portion 293 is guided along the female screw portion 271. That is, the convex portion 293 as the second screw portion is threadingly engaged with the female screw portion 271 as the first screw portion.

Incidentally, similar to the above-described embodiment, the specific positional relationship between the convex portion 293 of the liquid bottle 280 and the concave portion 272 of the corresponding ink tank 200 is provided with respect to each liquid bottle 280 and associated ink tank 200. Therefore, the liquid bottle 280 is attachable only to the corresponding ink tank 200, but cannot be attached to any of the ink tanks 200 other than the corresponding ink tank 200.

According to the first modification, since the single concave portion 272 is formed in the thread 274, complexity in shape of the outer sleeve 291 and the second sleeve 262 can be obviated.

Incidentally, the first sleeve 161 and the second sleeve 262 may not be integral with the frame of the ink tank 200 as in the embodiment. Alternatively, at least one of the first sleeve 161 and the second sleeve 262 may be provided as separate members from the frame of the ink tank 200.

Modification 2

FIGS. 19A through 20B illustrate a liquid bottle 380 and an ink tank 300 according to a second modification.

In the above-described embodiment, for the connection of the liquid bottle 80 to the ink tank 100, firstly, the convex portions 93 are guided by the respective concave portions 72, and then, the male screw portion 92 and the female screw portion 71 are threadingly engaged with each other. However, according to the second modification, for the connection of the liquid bottle 380 to the ink tank 300, firstly, a male screw portion 392 and a female screw portion 371 are threadingly engaged with each other, and then, convex portions 393 are guided by concave portions 372.

More specifically, as illustrated in FIGS. 19A through 20B, the liquid bottle 380 includes an outer sleeve 391, instead of the outer sleeve 91 of the embodiment. The outer sleeve 391 includes a first outer sleeve 391A and a second outer sleeve 391B.

The first outer sleeve 391A is integral with the outer wall 81 of the liquid bottle 380. That is, the first outer sleeve 391A is continuous with the outer wall 81. The first outer sleeve 391A has an outer peripheral surface 391Aa as an example of the peripheral surface of a first outer sleeve. The male screw portion 392 (as an example of the second screw portion) is provided at a tip end portion of the outer peripheral surface 391Aa.

Figure 19B:
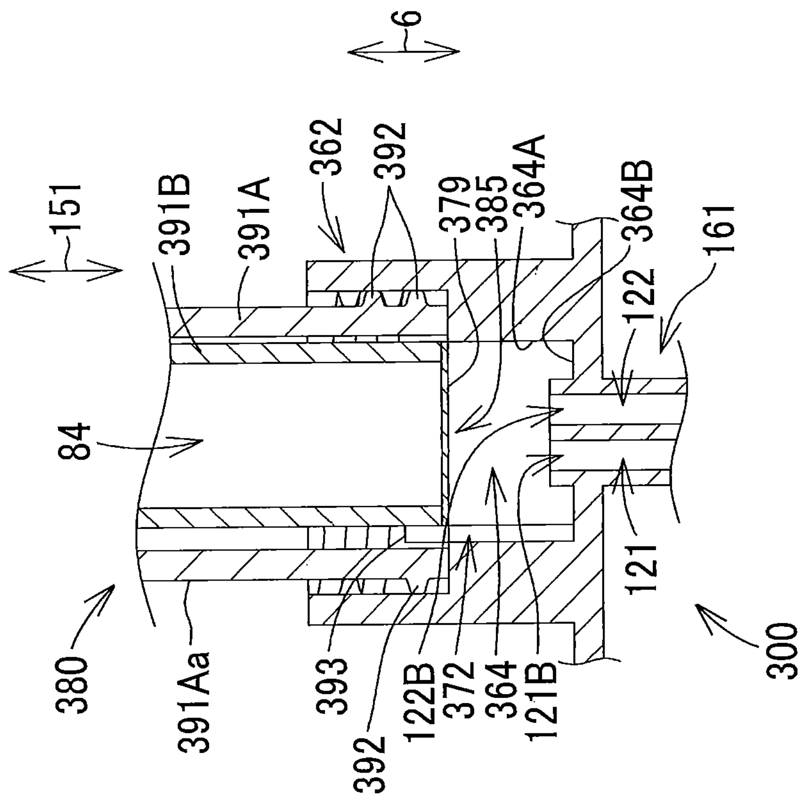
FIG. 19B is a vertical cross-sectional view illustrating the outer sleeve 391 of the liquid bottle 380 and the second sleeve 362 of the ink tank 300 in the multifunction peripheral according to the second modification, and particularly illustrating a state where a first outer sleeve 391A of the outer sleeve 391 is inserted into a first space 363 of the second sleeve 362.
Figure 19A:
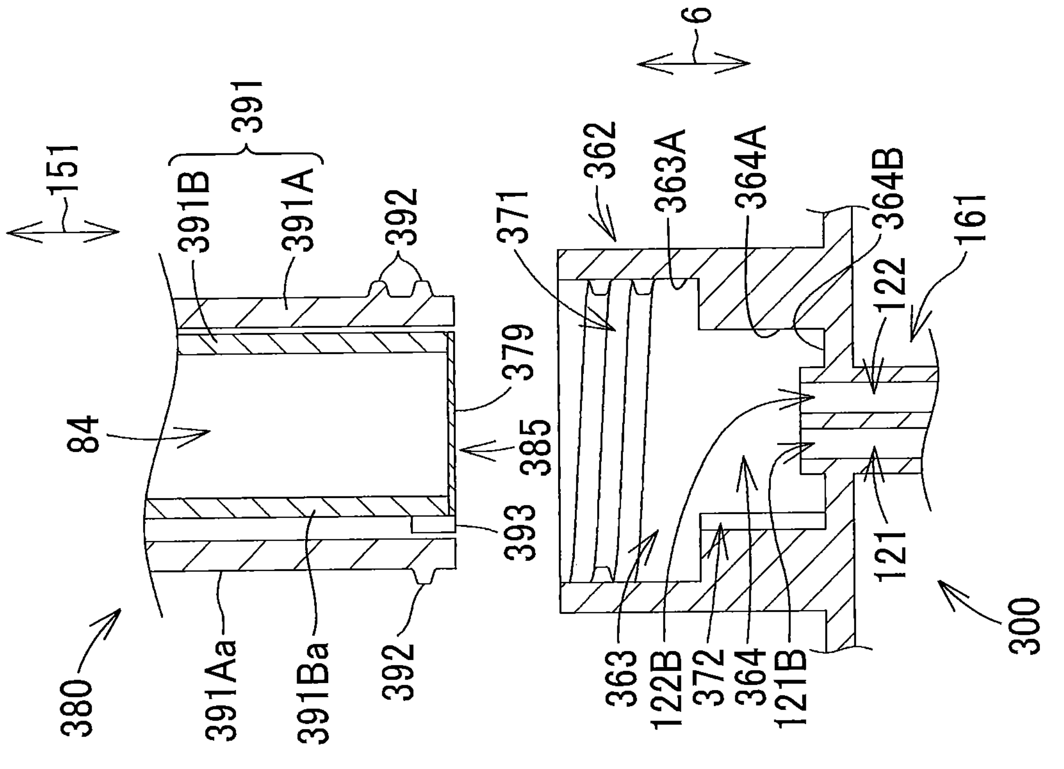
FIG. 19A is a vertical cross-sectional view illustrating an outer sleeve 391 of a liquid bottle 380 and a second sleeve 362 of an ink tank 300 in a multifunction peripheral according to a second modification, and particularly illustrating a state where the outer sleeve 391 is not yet inserted in the second sleeve 362.
Figure 20A:
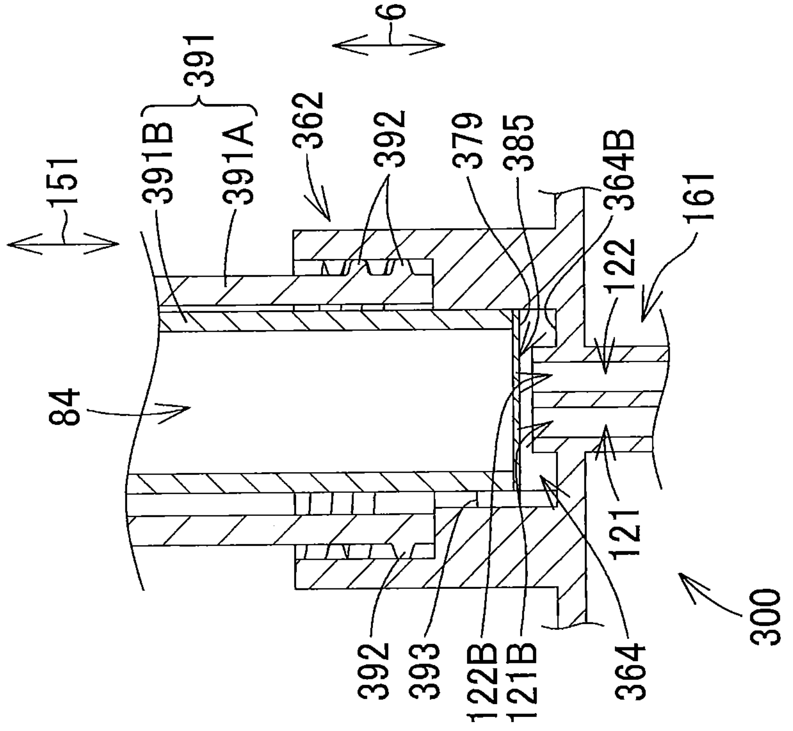
FIG. 20A is a vertical cross-sectional view illustrating the outer sleeve 391 of the liquid bottle 380 and the second sleeve 362 of the ink tank 300 in the multifunction peripheral according to the second modification, and particularly illustrating a state where a second outer sleeve 391B of the outer sleeve 391 is inserted into a second space 364 of the second sleeve 362.
Figure 20B:
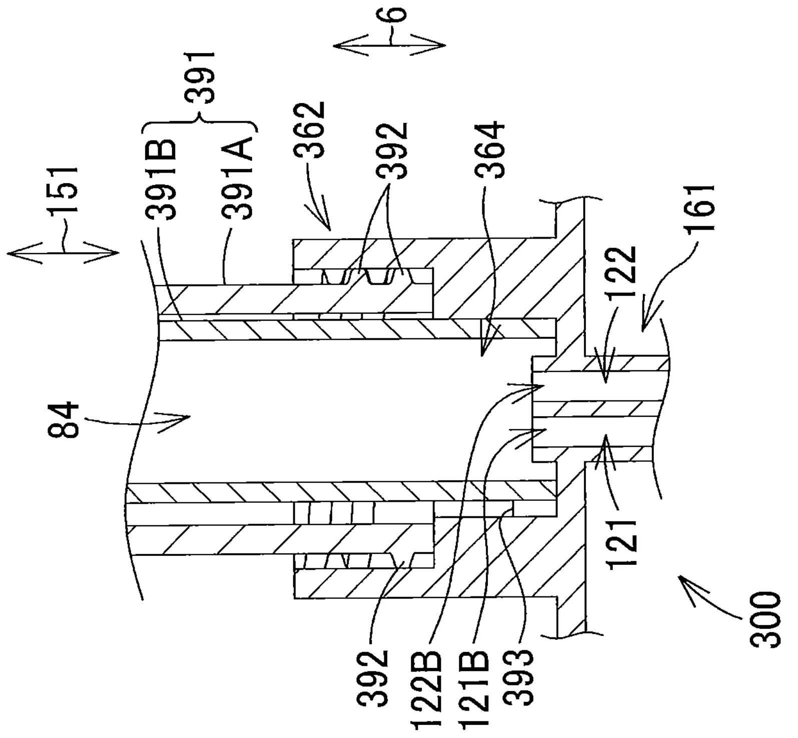
FIG. 20B is a vertical cross-sectional view illustrating the outer sleeve 391 of the liquid bottle 380 and the second sleeve 362 of the ink tank 300 in the multifunction peripheral according to the second modification, and particularly illustrating a state of connection between the outer sleeve 391 and the second sleeve 362.

The second outer sleeve 391B is supported by the outer wall 81 or the first outer sleeve 391A such that the second outer sleeve 391B is movable relative to the first outer sleeve 391A in the axial direction 151 between a first position (illustrated in FIG. 19A) and a second position (illustrated in FIG. 20B). The second outer sleeve 391B is accommodated in the first outer sleeve 391A at the first position. The second outer sleeve 391B protrudes out from the first outer sleeve 391A in the axial direction 151 at the second position. Incidentally, a conventional mechanism used in a click action ballpoint pen is available for moving the second outer sleeve 391B.

The second outer sleeve 391B has an outer peripheral surface 391Ba as an example of a peripheral surface of a second outer sleeve. The convex portions 393 (as an example of the second engagement portion) are provided at a tip end portion of the outer peripheral surface 391Ba. The second outer sleeve 391B has an open end as a supply opening 385. A seal 379 is provided at the open end for closing the supply opening 385.

The ink tank 300 includes the first sleeve 161 and a second sleeve 362. The second sleeve 362 defines therein a first space 363 and a second space 364 aligned with the first space 363 in the axial direction 151.

The first space 363 is positioned closer to a tip end of the second sleeve 362 than the second space 364 is to the tip end. The first space 363 has an inner diameter approximately equal to an outer diameter of the first outer sleeve 391A. The first space 363 has an open end that is open to the outside of the ink tank 300. The first space 363 has a base end in communication with the second space 364. The first space 363 is defined by an inner peripheral surface 363A of the second sleeve 362. The female screw portion 371 (as an example of the first screw portion) is formed in the inner peripheral surface 363A.

The second space 364 has an inner diameter approximately equal to an outer diameter of the second outer sleeve 391B. The second space 364 has a tip end in communication with the first space 363, and a base end defined by a surface 364B through which the tip end of the first sleeve 161 extends. Hence, the second space 364 is in communication with the air passage 121 and the liquid passage 122. The second space 364 is defined by an inner peripheral surface 364A of the second sleeve 362. The concave portions 372 are formed on the inner peripheral surface 364A to extend in the axial direction. The concave portions 372 are an example of the first engagement portion.

Similar to the above-described embodiment, for the connection of the liquid bottle 380 to the ink tank 300, firstly, the liquid bottle 380 is moved in the protruding direction 6 so that the outer sleeve 391 approaches the first sleeve 161 and the second sleeve 362, while the outer sleeve 391 is maintained in such a posture that the supply opening 385 faces the first sleeve 161 and the second sleeve 362 in the protruding direction 6, as illustrated in FIG. 19A. At this time, the second outer sleeve 391B is at the first position.

Then, as illustrated in FIG. 19B, the first outer sleeve 391A enters into the first space 363. At this time, the liquid bottle 380 is rotated in the clockwise direction about its axis. Hence, the male screw portion 392 of the first outer sleeve 391A is threadingly engaged with the female screw portion 371 of the second sleeve 362.

Subsequently, as illustrated in FIG. 20A, the second outer sleeve 391B is moved from the first position toward the second position. Incidentally, the liquid bottle 380 is provided with an operation portion (not illustrated) for moving the second outer sleeve 391B. User's manipulation of the non-illustrated operation portion causes the second outer sleeve 391B to protrude out from the first outer sleeve 391A and to advance into the second space 364. At this time, the convex portions 393 of the second outer sleeve 391B are guided by the concave portions 372 of the second sleeve 362 in the protruding direction 6. That is, in the process of connection of the outer sleeve 391 to the second sleeve 362, after completion of the threading engagement between the male screw portion 392 and the female screw portion 371, the convex portions 393 are guided by the concave portions 372 by the movement of the second outer sleeve 391B from the first position toward the second position.

As a result of further protruding movement of the second outer sleeve 391B from the state illustrated in FIG. 20A, the second outer sleeve 391B reaches the second position illustrated in FIG. 20B. At the second position, the seal 379 provided at the second outer sleeve 391B abuts against the first sleeve 161, and the seal 379 is pressed by the first sleeve 161. Hence, the seal 379 is wound along the slits to provide the open state of the seal 379. The state illustrated in FIG. 20B is the state of connection between the liquid bottle 380 and the ink tank 300.

For detaching the liquid bottle 380 from the ink tank 300, firstly, the user operates the operation portion (not illustrated) to move the second outer sleeve 391B from the second position to the first position. During this movement, the convex portions 393 of the second outer sleeve 391B are guided by the concave portions 372 of the second sleeve 362 in the protruding direction 6. Then, the user rotates the liquid bottle 380 in the counterclockwise direction. Hence, the male screw portion 392 of the first outer sleeve 391A is disengaged from the female screw portion 371 of the second sleeve 362, so that the liquid bottle 380 can be detached from the ink tank 300.

Incidentally, similar to the above-described embodiment, the specific positional relationship between the convex portions 393 of the liquid bottle 380 and the concave portions 372 of the ink tank 300 is provided with respect to each liquid bottle 380 and associated ink tank 300. Therefore, the liquid bottle 380 is attachable only to the corresponding ink tank 300, but cannot be attached to any of the ink tanks 300 other than the corresponding ink tank 300.

According to the second modification, since the male screw portion 392 and the convex portions 393 are provided in the discrete components (i.e., in the first outer sleeve 391A and second outer sleeve 391B, respectively), shapes and positions of the convex portion 393 can be determined without any binding of the shape and position of the male screw portion 392.

Modification 3

Figure 21B:
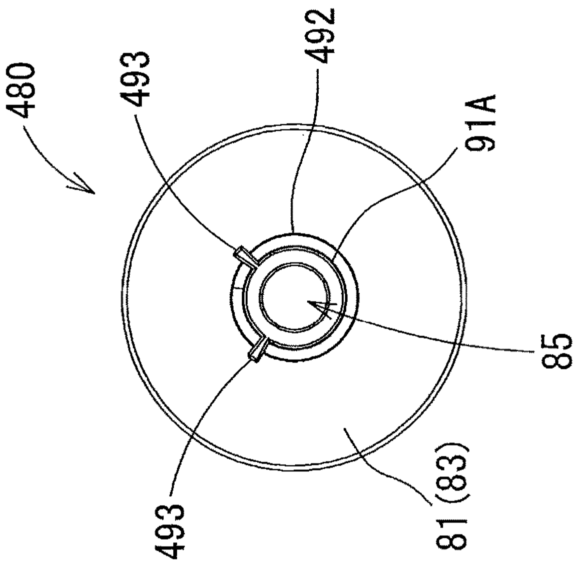
FIG. 21B is a view illustrating an outer sleeve 491 of the liquid bottle 480 as viewed in an axial direction thereof from a tip end to a base end of the liquid bottle 480 in the multifunction peripheral according to the third modification.
Figure 21A:
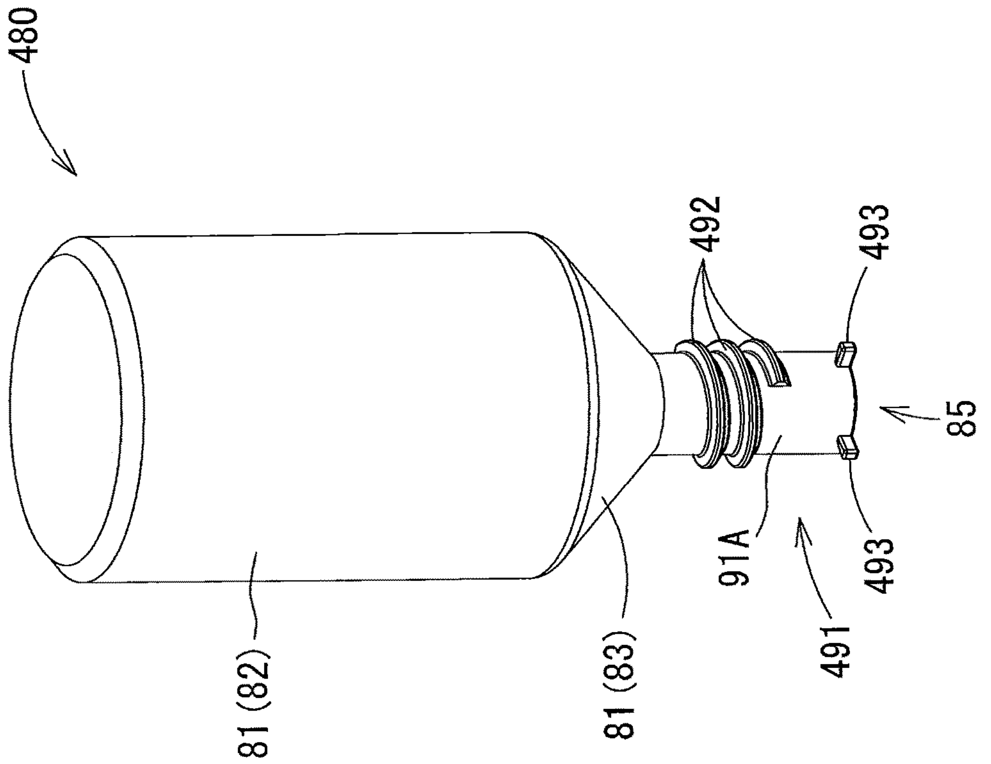
FIG. 21A is a perspective view of a liquid bottle 480 in a multifunction peripheral according to a third modification.
Figure 22:
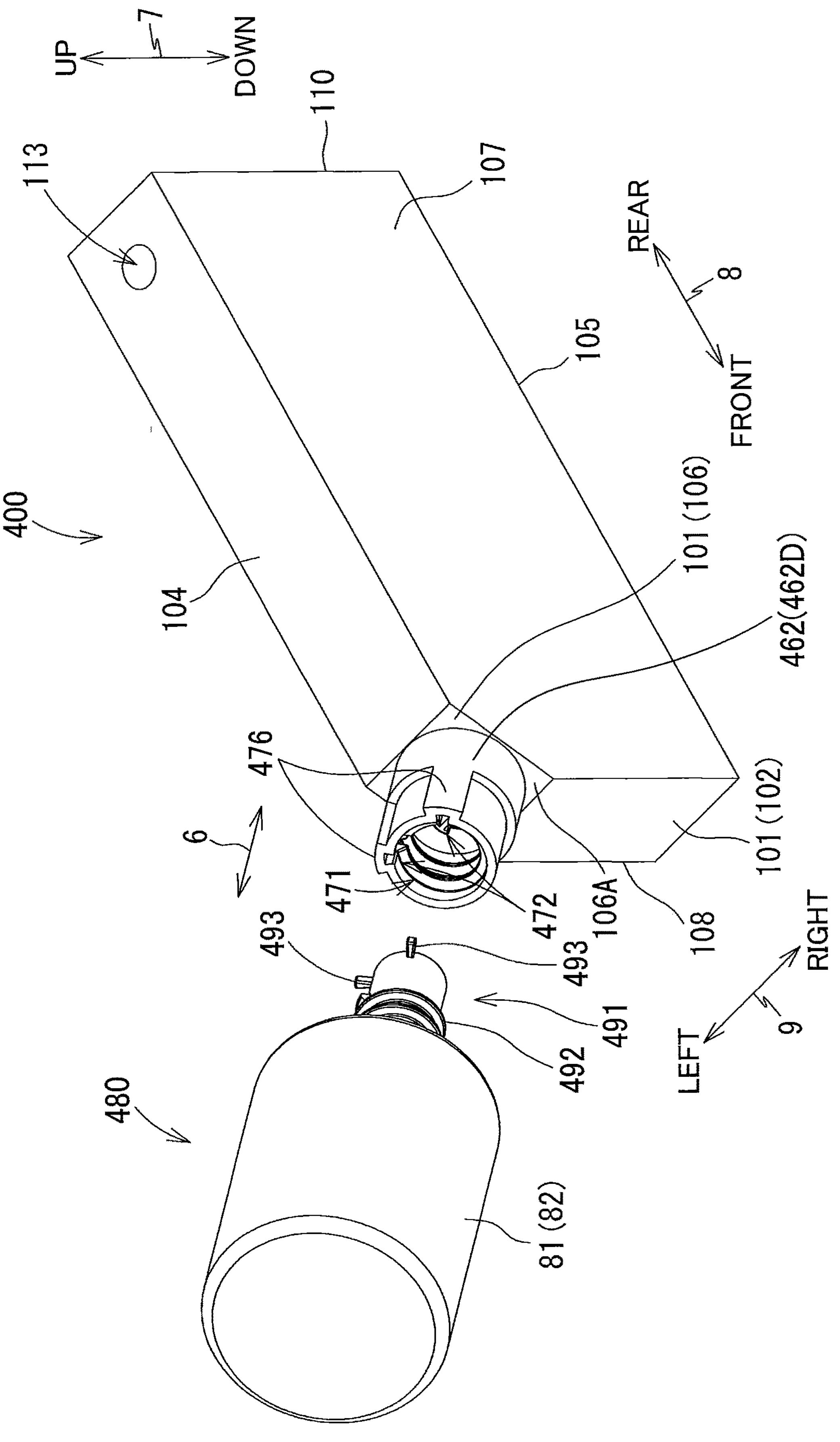
FIG. 22 is a perspective view illustrating the liquid bottle 480 and an ink tank 400 in the multifunction peripheral according to the third modification.

FIGS. 21A through 22 illustrate a liquid bottle 480 and an ink tank 400 according to a third modification.

In the above-described embodiment, the protruding length of the convex portions 93 in the radial direction of the outer sleeve 91 is equal to or smaller than the protruding length of the male screw portion 92. In contrast, according to the third modification, a protruding length of convex portions 493 (corresponding to the convex portion 93) is greater than a protruding length of a male screw portion 492 (corresponding to the male screw portion 92).

Specifically, as illustrated in FIGS. 21A and 21B, an outer sleeve 491 of the liquid bottle 480 of the third modification includes the male screw portion 492 and two convex portions 493. The ink tank 400 includes the first sleeve 161 and a second sleeve 462. The second sleeve 462 includes a female screw portion 471 (corresponding to the female screw portion 71), and two concave portions 472 formed in an inner peripheral surface of the second sleeve 462. Each of the concave portions 472 has a depth corresponding to the protruding length of each convex portions 493. In order to ensure the depth of the concave portions 472, two protruding portions 476 are provided on an outer peripheral surface 462D of the second sleeve 462 each at a position corresponding to each of the concave portions 472.

Incidentally, the second sleeve 462 also includes a convex portion (not illustrated) corresponding to the convex portion 73. The convex portion has a protruding length in a radial direction of the second sleeve 462 that is not more than a protruding length of a thread of the female screw portion 471 and a protruding length of the male screw portion 492 of the outer sleeve 491. However, the protruding length in the radial direction of the convex portion (not illustrated) of the second sleeve 462 may be greater than the protruding lengths of the thread of the female screw 471 and the male screw 492.

Modification 4

In the above-described embodiment, the ink tank 100 includes the first sleeve 161 and the second sleeve 162. However, an alternative structure is available.

Figure 23:
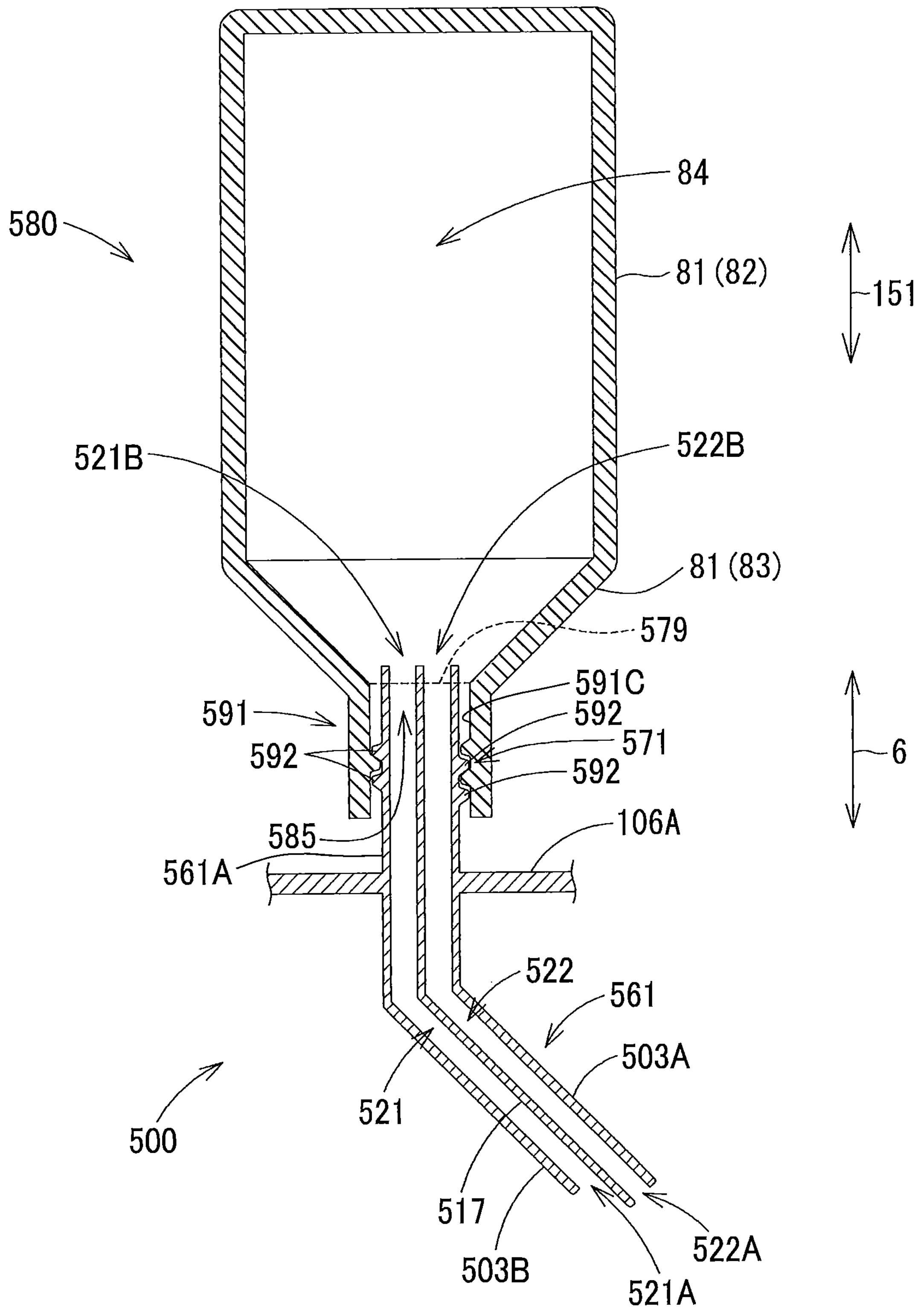
FIG. 23 is a vertical cross-sectional view illustrating a liquid bottle 580 and a first sleeve 561 of an ink tank 500 in a multifunction peripheral according to a fourth modification, and particularly illustrating a state of connection between the liquid bottle 580 and the ink tank 500.

FIG. 23 illustrates a liquid bottle 580 and an ink tank 500 according to a fourth modification to the embodiment. The ink tank 500 does not include the second sleeve 162, but only includes a first sleeve 561 corresponding to the first sleeve 161. A male screw portion 592 and concave portions (not illustrated) are provided at an outer peripheral surface 561A of the first sleeve 561. Further, a partition wall 517 is provided inside the first sleeve 561 at a position between a front wall part 503A and a rear wall part 503B. Hence, an internal space of the first sleeve 561 is divided into an air passage 521 and a liquid passage 522. The air passage 521 is in communication with the ink chamber 111 through an opening 521A. The liquid passage 522 is in communication with the ink chamber 111 through an opening 522A.

The liquid bottle 580 includes an outer sleeve 591. A female screw portion 571 and convex portions (not illustrated) are provided at an inner peripheral surface 591C of the outer sleeve 591. A seal 579 is positioned at a deep end of the outer sleeve 591, i.e., at a boundary between the outer sleeve 591 and the tapered portion 83. Incidentally, the seal 579 is opened in a state illustrated in FIG. 23, but the seal 579 in its closed state is indicated by a broken line in FIG. 23.

In FIG. 23, the outer sleeve 591 of the liquid bottle 580 is connected to the first sleeve 561. Similar to the above-described embodiment, the convex portions (not illustrated) of the liquid bottle 580 are guided by the corresponding concave portions (not illustrated) of the ink tank 500, and the male screw portion 592 of the second sleeve 562 is threadingly engaged with the female screw portion 571 of the liquid bottle 580. Then, the seal 579 is opened by abutment of the seal 579 against the first sleeve 561 to open a supply opening 585 of the liquid bottle 580. In the connection state, the air passage 521 is in communication with the internal space 84 through an opening 521B, and the liquid passage 522 is in communication with the internal space 84 through an opening 522B.

Modification 5

In the above-described embodiment, capability of connection between the outer sleeve 91 and the second sleeve 162 is determined by the positional relationship between the convex portions 93 and the concave portions 72. However, capability of the connection may be determined by another structure.

Figure 24:
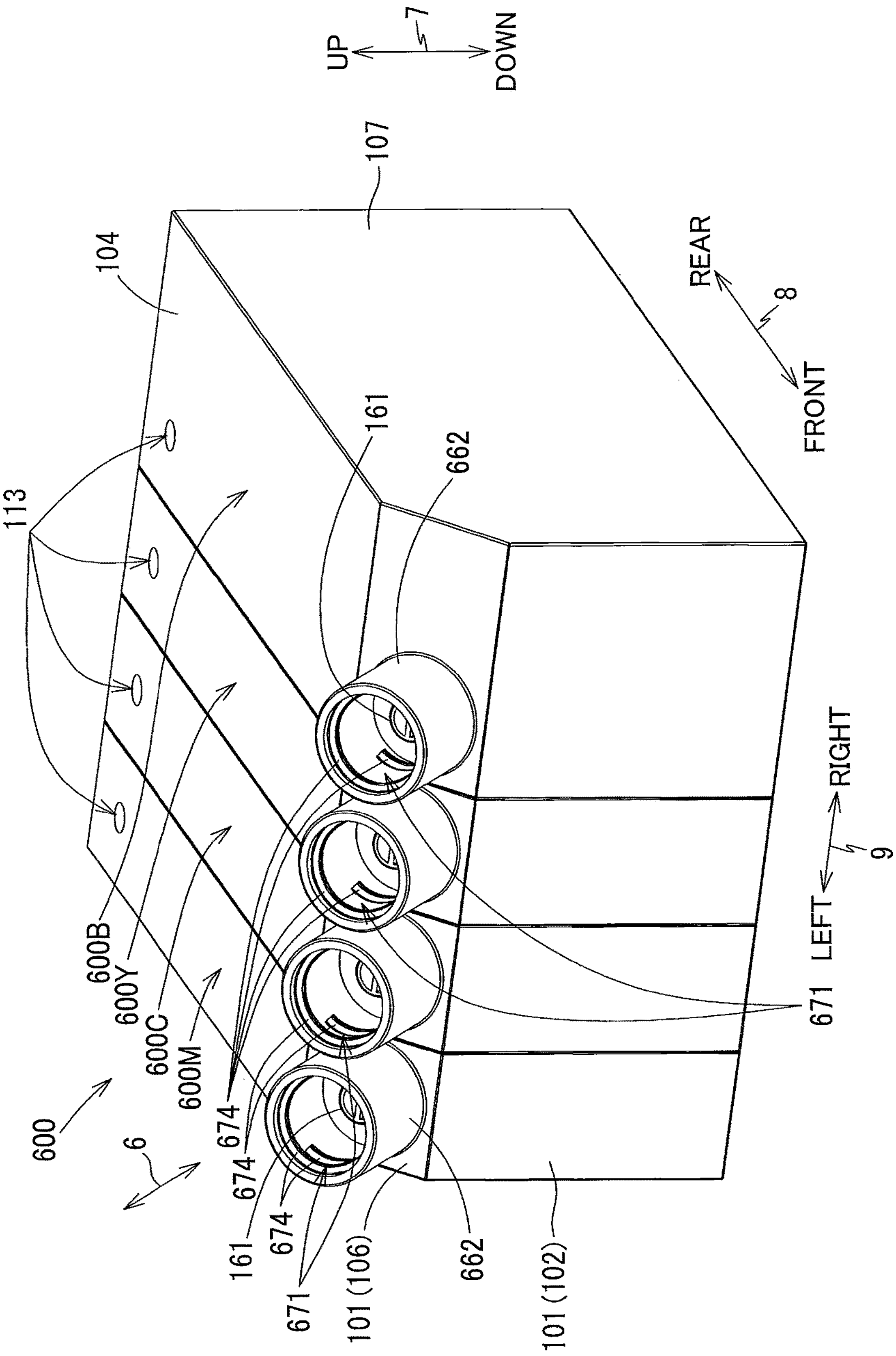
FIG. 24 is a perspective view illustrating ink tanks 600 in a multifunction peripheral according to a fifth modification.

FIG. 24 illustrates ink tanks 600 according to a fifth modification to the embodiment. As illustrated in FIG. 24, each of ink tanks 600B, 600Y, 600C and 600M of the fifth modification includes: the first sleeve 161 of the embodiment; and a second sleeve 662 having an inner peripheral surface formed with a female screw portion 671. In the respective ink tanks 600B, 600Y, 600C and 600M, a pitch of the female screw portion 671 of the second sleeve 662 is different from one another. That is, a distance between neighboring turns of a thread 674 constituting the female screw portion 671 in the protruding direction 6 is different in each of the ink tanks 600B, 600Y, 600C and 600M. In this connection, in liquid bottles (not shown) connectable to these ink tanks 600, a pitch of a male screw portion (not illustrated) provided at an outer peripheral surface of an outer sleeve is different from one another according to the color of the stored ink.

With this structure, similar to the above-described embodiment, the specific relationship in terms of pitch between the female screw portion 671 of the ink tank 600 and the male screw portion of the outer sleeve of the ink bottle is provided with respect to each ink tank 600 and its associated ink bottle. Therefore, the male screw portion of the liquid bottle is threadingly engageable with the female screw portion 671 of the corresponding ink tank 600, so that the liquid bottle is attachable to the corresponding ink tank 600. However, the male screw portion of the liquid bottle cannot threadingly engage with the female screw portion 671 of any of the ink tanks 600 other than the corresponding ink tank 600 due to the difference in pitch of the male screw portion and the female screw portion 671. Hence, the liquid bottle cannot be attached to any one of the non-corresponding ink tanks 600. Incidentally, the female screw portion 671 (thread 674) is an example of the first engagement portion, and the male screw portion is an example of the second engagement portion.

Incidentally, the first sleeve 161 and the second sleeve 662 may not be integral with the frame of the ink tank 600 as in the depicted embodiment, but at least one of the first sleeve 161 and the second sleeve 662 may be provided as separate members from the frame of the ink tank 600.

Modification 6

In the above-described embodiment, the air passage 121 and the liquid passage 122 are formed in the first sleeve 161. However, the air passage 121 and the liquid passage 122 may be formed in sleeves different from each other.

Figure 25:
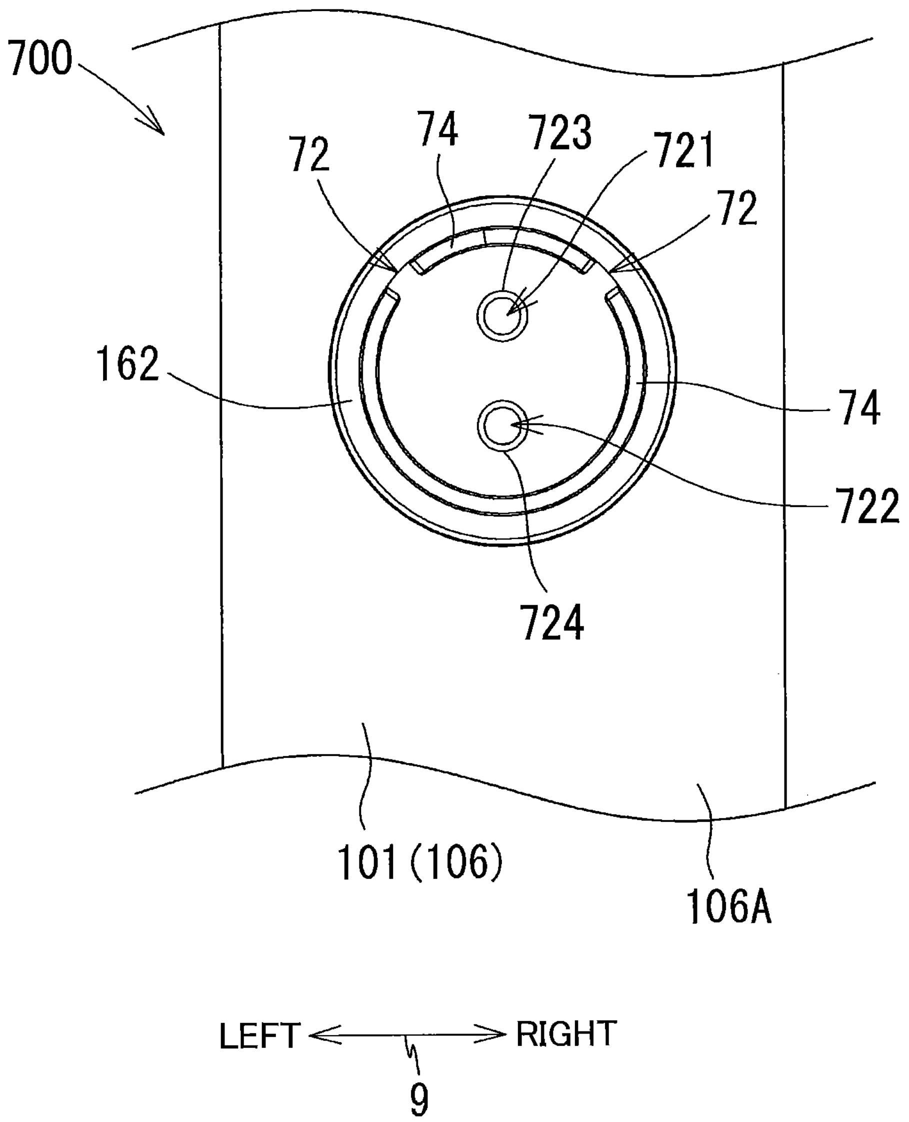
FIG. 25 is a view illustrating the second sleeve 162, a sleeve 723 and a sleeve 724 independent of the sleeve 723 in an ink tank 700 as viewed in the protruding direction 6 from a tip end to a base end of the sleeves 723 and 724 in a multifunction peripheral according to a sixth modification.

FIG. 25 illustrates an ink tank 700 according to a sixth modification to the embodiment. The ink tank 700 includes a sleeve 723, and a sleeve 724, instead of the first sleeve 161 of the embodiment. As illustrated in FIG. 25, an air passage 721 is formed in the sleeve 723, and a liquid passage 722 is formed in the sleeve 724 different from the sleeve 723.

Modification 7

In the above-described embodiment, the first sleeve 161 (the air passage 121 and the liquid passage 122) and the second sleeve 162 are integrally formed with the frame of the ink tank 100. However, at least one of the first sleeve 161 and the second sleeve 162 may be a separate member not integral with the frame of the ink tank 100. That is, at least one of the first sleeve 161 and the second sleeve 162 may be attachable to and detachable from the frame of the ink tank 100.

Figure 26:
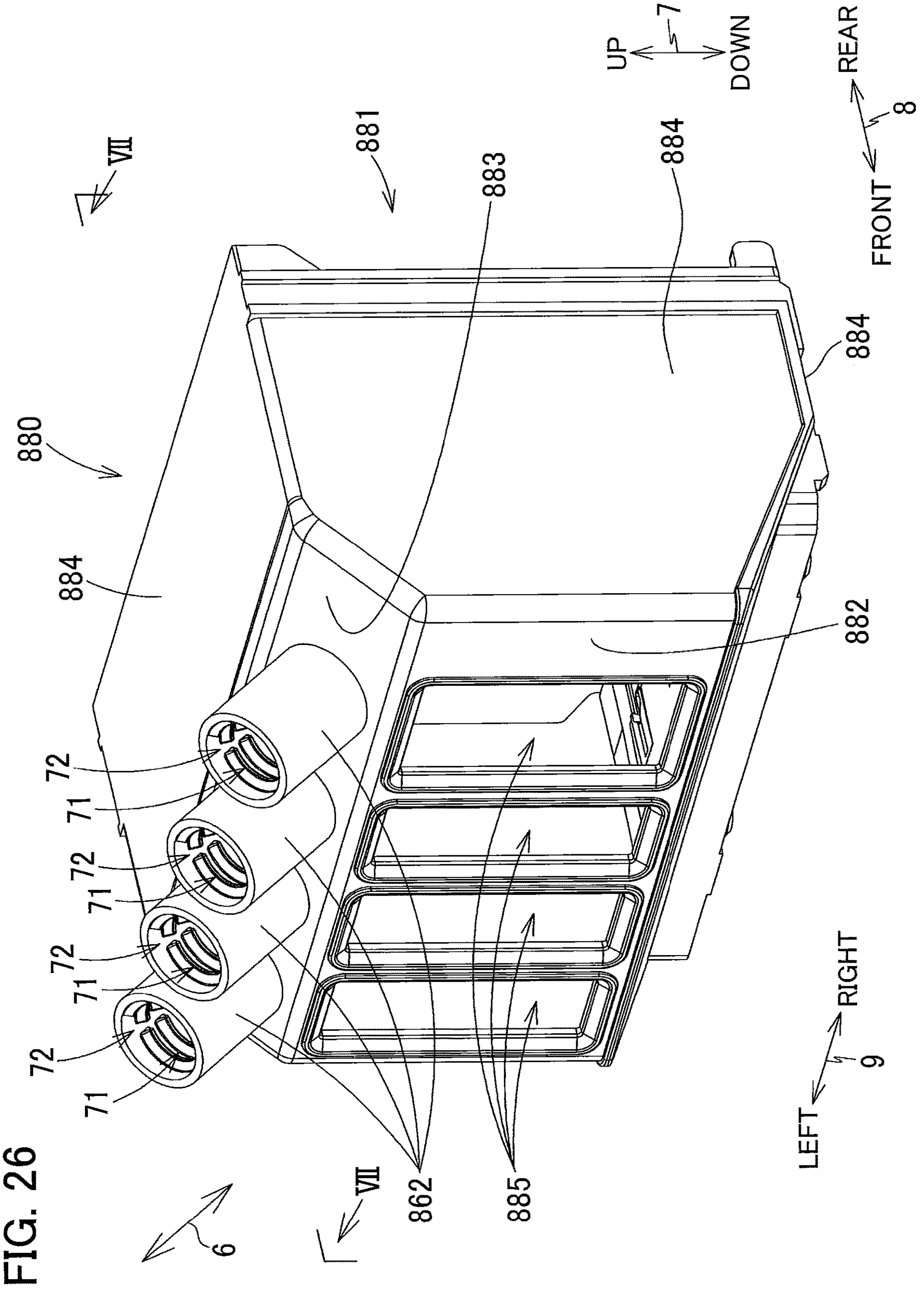
FIG. 26 is a view illustrating a holding member 880 in a multifunction peripheral according to a seventh modification.
Figure 27:
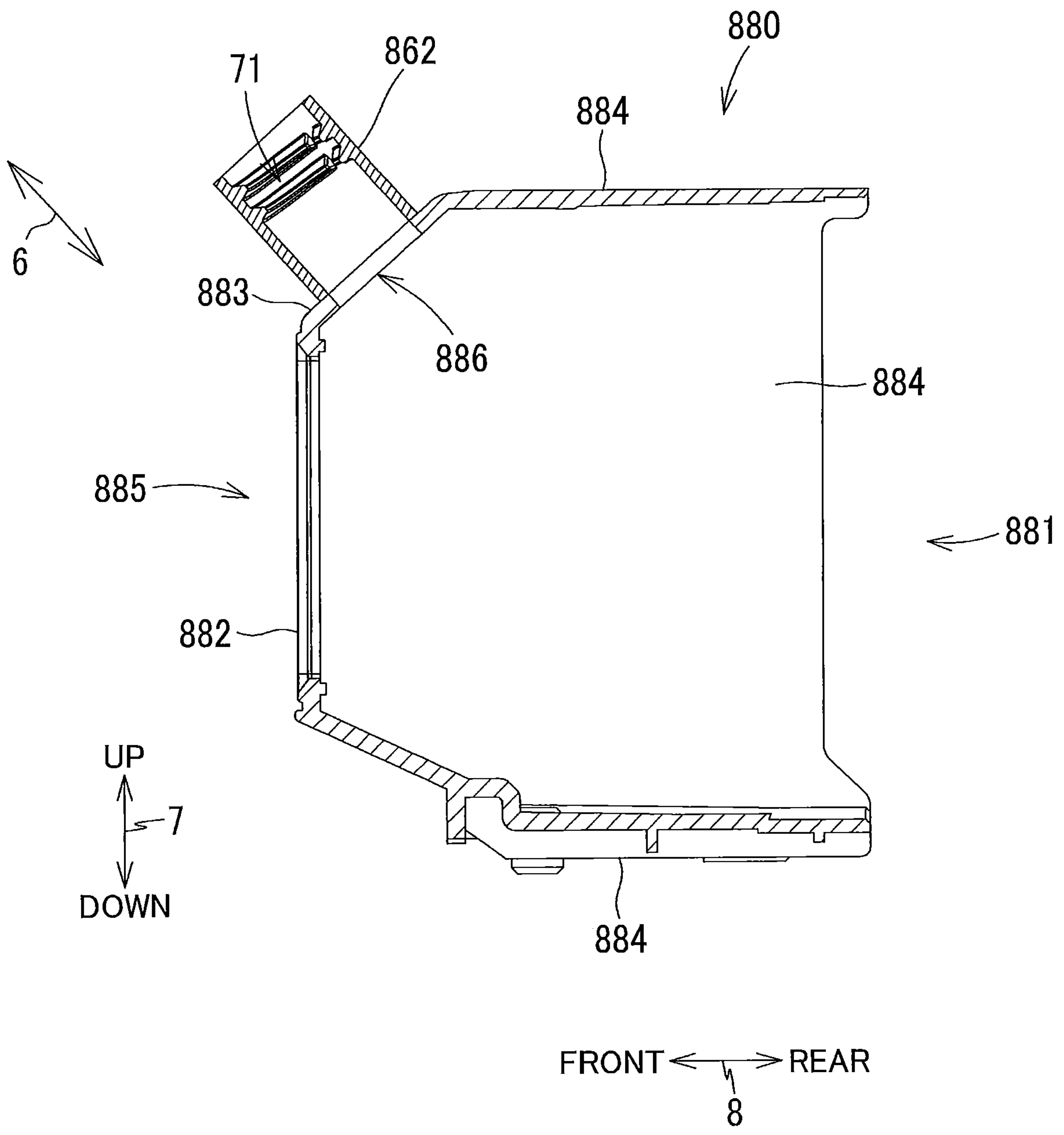
FIG. 27 is a cross-sectional view of the holding member 880 taken along a plane VII-VII in FIG. 26.
Figure 28:
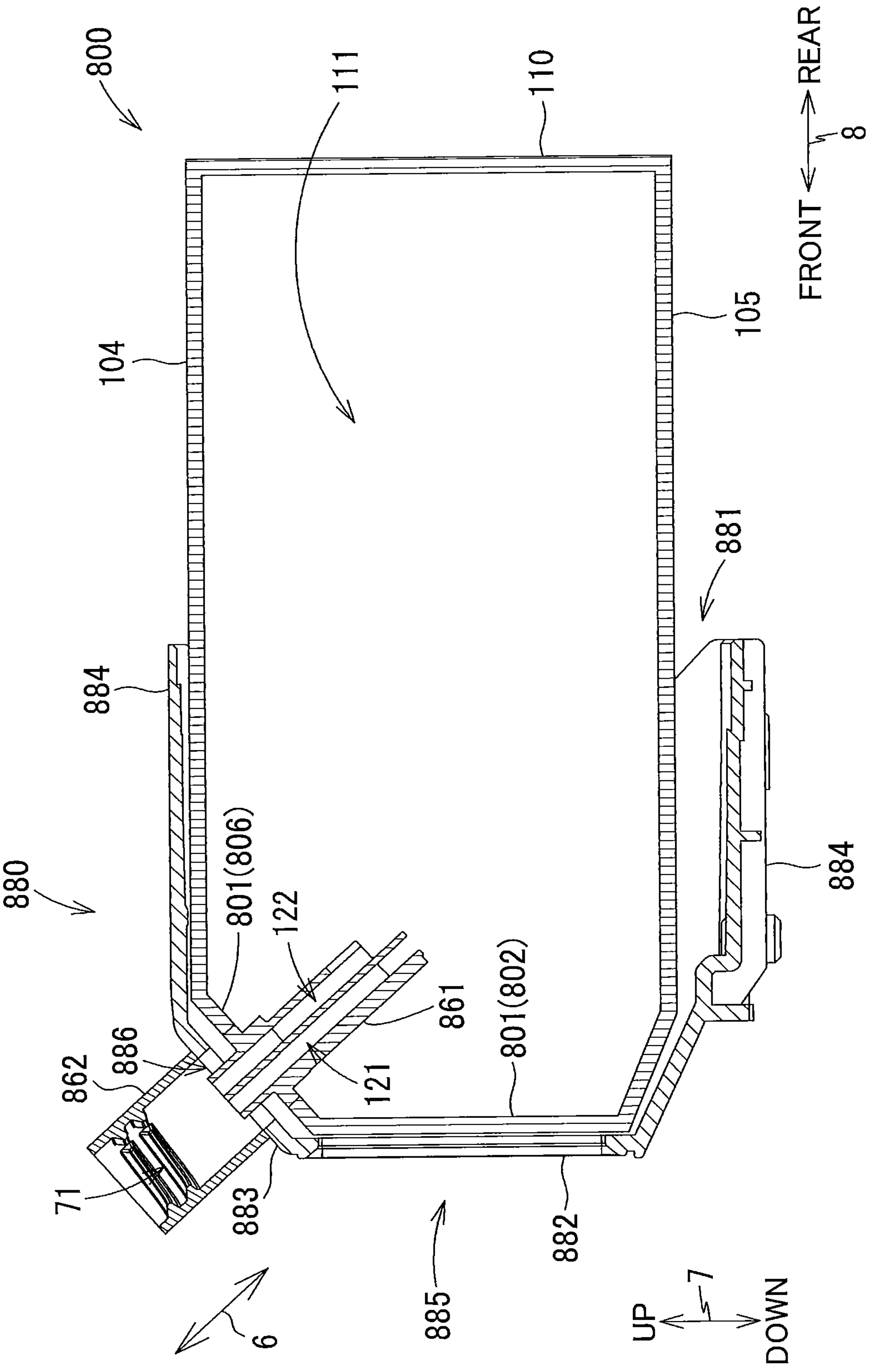
FIG. 28 is a cross-sectional view of the holding member 880 holding ink tanks 800 taken along the plane VII-VII in FIG. 26.

FIGS. 26 and 27 illustrate a holding member 880 that can be fixed to the housing 14 (FIG. 1). Second sleeves 862 corresponding to the second sleeves 162 are provided in the holding member 880. As illustrated in FIG. 28, an ink tank 800 according to a seventh modification is not provided with a structure corresponding to the second sleeve 162, but is provided with a first sleeve 861 corresponding to the first sleeve 161.

The holding member 880 is configured to hold a plurality of the ink tanks 800 arranged side by side in the leftward/rightward direction 9. The four ink tanks 800 arranged in line in the leftward/rightward direction 9 (see FIG. 4) are held integrally by the holding member 880. As illustrated in FIG. 28, the holding member 880 covers a front portion of each ink tank 800 while holding the ink tanks 800.

As illustrated in FIGS. 26 and 27, the holding member 880 has a box-like shape having an opening 881. The four ink tanks 800 are attached to an interior of the holding member 880 through the opening 881. The holding member 880 has at least a portion that is positioned inside the housing 14 while the holding member 880 holds the four ink tanks 800. In this state, the opening 881 is at a rear side of the holding member 880 and is open rearward.

The holding member 880 includes an upright wall 882, an inclined wall 883, and side walls 884. The upright wall 882 extends in the upward/downward direction 7 and the leftward/rightward direction 9. The inclined wall 883 extends from an upper end of the upright wall 882 diagonally upward and rearward.

One of the side walls 884 is a top wall extending rearward from an upper end of the inclined wall 883. Another one of the side walls 884 is a bottom wall extending rearward from a lower end of the upright wall 882, and remaining two side walls 884 extend rearward from right and left ends of the inclined wall 883 and the upright wall 882, respectively. The opening 881 is defined by rear ends of the four side walls 884.

The side wall 884 extending rearward from the lower end of the upright wall 882 (bottom wall) supports the ink tanks 800 from below.

The upright wall 882 is formed with a plurality of openings 885. The openings 885 are arrayed with each other in the leftward/rightward direction 9 with an interval between neighboring two of the openings 885. Each opening 885 corresponds to each ink tank 800. Each ink tank 800 has a front wall 801 configured of: an upright wall 802 (corresponding to the upright wall 102); and an inclined wall 806 (corresponding to the inclined wall 106). The upright wall 802 is exposed to the outside of the multifunction peripheral 10 through the corresponding opening 885. Hence, a user can visually recognize an amount of ink stored in each ink tank 800 through the upright wall 802 and the opening 885.

The second sleeves 862 are provided at the inclined wall 883. The second sleeves 862 are integral with the holding member 880. Alternatively, the second sleeves 862 may be separate members from the holding member 880, and may be attachable to and detachable from the holding member 880.

As illustrated in FIG. 27, the inclined wall 883 is formed with openings 886 each at a position corresponding to a base end of each second sleeve 862. As illustrated in FIG. 28, each ink tank 800 includes the first sleeve 861 provided at the inclined wall 806. In a state where the holding member 880 holds the ink tanks 800, a tip end portion of each first sleeve 861 protrudes into an interior of the corresponding second sleeve 862 through the opening 886. Hence, the positional relationship between the first sleeve 861 and the second sleeve 862 is similar to that between the first sleeve 161 and the second sleeve 162 in the above-described embodiment. As a result, in the seventh modification, the outer sleeve 91 of the liquid bottle 80 is connectable to the first and second sleeves 861 and 862.

Other Modifications

In the above-described embodiment illustrated in FIGS. 10 through 13, the ink tank 100 includes the female screw portion 71 as the first screw portion, and the liquid bottle 80 includes the male screw portion 92 as the second screw portion. However, in contrast to the embodiment, the ink tank 100 may include a male screw portion as the first screw portion, and the liquid bottle 80 may include a female screw portion as the second screw portion.

In the above-described embodiment, the ink tank 100 includes the concave portions 72 as the first engagement portion, and the liquid bottle 80 includes the convex portions 93 as the second engagement portion. However, in contrast to the embodiment, the ink tank 100 may include convex portions as the first engagement portion, and the liquid bottle 80 may include concave portions as the second engagement portion.

In the above-described embodiment, the second sleeve 162 includes the convex portion 73 as the regulating portion. However, in contrast to the embodiment, the outer sleeve 91 may include the convex portion 73 as the regulating portion. In a case where the convex portion 73 (the regulating portion) is provided at the outer peripheral surface 91A of the outer sleeve 91, the convex portion 73 may be formed at a position adjacent to an end of the male screw portion 92, the end being closer to a base end of the outer sleeve 91 (i.e., the tapered portion 83) than to the tip end of the outer sleeve 91 in the axial direction 151.

In the ink tank 100 of the above-described embodiment, the first sleeve 161 and the second sleeve 162 protrude diagonally upward and frontward from the outer surface 106A of the inclined wall 106. However, the positions and protruding direction of the first and second sleeves 161 and 162 may not be limited to those in the above-described embodiment. For example, the first sleeve 161 and second sleeve 162 may protrude in the vertical direction or horizontal direction. Incidentally, the liquid passage 122 may be positioned below the air passage 121 in a case where the first sleeve 161 protrudes in a direction other than the vertical direction. Positional relationship between the liquid passage 122 and the air passage 121 may be arbitrary in a case where the first sleeve 121 protrudes in the vertical direction.

In the ink tank 100 of the above-described embodiment, as illustrated in FIG. 6, the first sleeve 161 has a first part within the ink chamber 111 extending in the upward/downward direction 7, and a second part extending in the protruding direction 6 (in the direction along the center axis 162B) from the interior of the ink chamber 111 to the outside of the ink chamber 111. However, the configuration of the first sleeve 161 may not be limited to that of the depicted embodiment. For example, the first sleeve 161 in its entirety may extend in the protruding direction 6. Alternatively, the first sleeve 161 in its entirety may extend in the upward/downward direction 7.

The liquid bottle 80 and the ink tank 100 may be shaped differently from the depicted embodiment. For example, the liquid bottle 80 may be hollow cylindrical without the tapered portion 83, or may be a hollow quadrangular prismatic. Further, the ink tank 100 may have a shape of rectangular parallelepiped without the inclined wall 106.

In the above-described embodiment, ink is an example of the liquid. However, pretreatment liquid (which is ejected onto the sheet prior to ejection of ink for printing) or water (which is ejected to a region near the nozzles 40 of the recording head 39 for protection against desiccation of the nozzles 40) is also available as the liquid.

While the description has been made in detail with reference to the embodiments thereof, it would be apparent to those skilled in the art that many modifications and variations may be made therein without departing from the scope of the disclosure.

What is claimed is:

1. A liquid supplying system comprising:

a tank comprising:

a casing defining therein a storage chamber for storing a liquid therein; and an air communicating portion formed in the casing and having an air communication opening through which air is allowed to communicate between the storage chamber and an atmosphere;

a first tubular portion having an inner end positioned inside the storage chamber and an outer end positioned outside of the storage chamber, the inner end being an open end and positioned lower than a part of the air communicating portion, the outer end being an open end to allow the storage chamber to communicate with an outside of the tank;

a second tubular portion through which the storage chamber is allowed to communicate with the outside of the tank;

a guide portion extending in a predetermined direction, the guide portion surrounding the first tubular portion and the second tubular portion as viewed in the predetermined direction, the guide portion having an inner peripheral surface formed with a first engagement portion; and a liquid bottle comprising;

an outer wall defining therein an internal space for storing the liquid to be stored in the storage chamber of the tank;

a connection portion connectable to the guide portion and providing communication between the internal space and an outside of the outer wall, the connection portion including a bottle screw portion and a second engagement portion at an outer peripheral surface of the connection portion, the second engagement portion being engageable with the first engagement portion, the first engagement portion being configured to guide the second engagement portion to move in the predetermined direction in a process to connect the connection portion to the guide portion; and a bottle cap attachable to the connection portion in a state where the connection portion is not connected to the guide portion, wherein the bottle screw portion is surrounded by the inner peripheral surface of the guide portion in a state where the connection portion is connected to the guide portion, and the bottle screw portion is surrounded by an inner peripheral surface of the bottle cap in a state where the bottle cap is attached to the connection portion, and wherein the second engagement portion is a protrusion protruding in a radial direction of the connection portion, and the bottle screw portion is a thread that protrudes further outward relative to the protrusion constituting the second engagement portion in the radial direction.

2. The liquid supplying system according to claim 1, wherein the guide portion is provided at the tank.

3. The liquid supplying system according to claim 1, wherein the first tubular portion and the second tubular portion extend in a direction including a horizontal component.

4. The liquid supplying system according to claim 1, wherein the first tubular portion and the second tubular portion extend in a direction including a vertical component.

5. The liquid supplying system according to claim 1, wherein the first tubular portion and the second tubular portion are integral with each other.

6. The liquid supplying system according to claim 1, wherein the first engagement portion is at an exposure position at which the first engagement portion is exposed to the outside of the tank.

7. The liquid supplying system according to claim 1, wherein a plurality of the tanks each according to claim 1, a plurality of the guide portions each according to claim 1, and a plurality of the liquid bottles each according to claim 1 are provided, and wherein positional relationships between the first engagement portion of one of the guide portions and the second engagement portion of corresponding one of the liquid bottles are different from one another in the plurality of the guide portions and the plurality of the liquid bottles, such that the first engagement portion of one of the guide portions allows the second engagement portion of corresponding one of the liquid bottles to be engaged for guiding movement of the connection portion of the corresponding liquid bottle, but prevents the second engagement portion of non-corresponding ones of the liquid bottles from being engaged.

8. The liquid supplying system according to claim 1, wherein the tank and the guide portion are integral with each other.

9. The liquid supplying system according to claim 1, wherein the second tubular portion has an inner end positioned inside the storage chamber and an outer end positioned outside of the storage chamber, the inner end being an open end and positioned lower than the part of the air communicating portion, the outer end being an open end to allow the storage chamber to communicate with the outside of the tank.

10. The liquid supplying system according to claim 1, wherein the inner peripheral surface of the bottle cap is formed with a cap screw portion, and wherein the bottle screw portion is threadingly engageable with the cap screw portion in the state where the bottle cap is attached to the connection portion.

11. The liquid supplying system according to claim 1, wherein the guide portion has a guide screw portion formed on the inner peripheral surface of the guide portion, and wherein the bottle screw portion is threadingly engageable with the guide screw portion in the state where the connection portion is connected to the guide portion.

12. The liquid supplying system according to claim 1, further comprising a fixing portion configured to fix the connection portion to the guide portion as a result of rotation of the liquid bottle in the process to connect the connection portion to the guide portion.

13. The liquid supplying system according to claim 12, wherein the fixing portion comprises:

a guide screw portion formed on the inner peripheral surface of the guide portion; and the bottle screw portion, the bottle screw portion being threadingly engageable with the guide screw portion.

14. The liquid supplying system according to claim 1, further comprising:

a guide screw portion formed on the inner peripheral surface of the guide portion and threadingly engageable with the bottle screw portion, wherein the liquid bottle further comprises a valve changeable in state between a closed state blocking communication between the internal space and the outside of the liquid bottle and an open state providing communication between the internal space and the outside of the liquid bottle, and wherein, in the process to attach the connection portion to the guide portion, the valve is configured to abut against the tank to change from the closed state to the open state after the threading engagement between the guide screw portion and the bottle screw portion is started.

15. The liquid supplying system according to claim 14, wherein, in a process to disconnect the connection portion from the guide portion, the threading engagement between the guide screw portion and the bottle screw portion is released after the valve is separated from the tank.

16. The liquid supplying system according to claim 1, further comprising:

a guide screw portion formed on the inner peripheral surface of the guide portion and threadingly engagable with the bottle screw portion, wherein the connection portion defines an axis extending in an axial direction and comprises:

a first connection portion connected to the outer wall and having the outer peripheral surface formed with the bottle screw portion; and a second connection portion supported by one of the outer wall and the first connection portion, the second connection portion being movable in the axial direction between a first position and a second position, the second connection portion being accommodated in the first connection portion in the first position, and the second connection portion protruding out from the first connection portion in the second position, the second connection portion having an outer peripheral surface provided with the second engagement portion.

17. The liquid supplying system according to claim 16, wherein, in the process to connect the connection portion to the guide portion, the second engagement portion is guided by the first engagement portion in accordance with movement of the second connection portion from the first position toward the second position after the threading engagement between the guide screw portion and the bottle screw portion is started.

18. The liquid supplying system according to claim 1, wherein a plurality of the tanks each according to claim 1, and a plurality of the guide portions each according to claim 1, are provided, the liquid supplying system further comprising a plurality of tank caps each corresponding to one of the plurality of the guide portions, each tank cap having an outer peripheral surface provided with an engagement portion corresponding to the second engagement portion of the connection portion, each of the engagement portions being at a position corresponding to a position of the first engagement portion of the corresponding one of the plurality of guide portions, wherein each of the tank caps is attachable to the corresponding one of the guide portions by the engagement portion of the tank cap being guided by the first engagement portion of the corresponding one of the plurality of guide portions, but the engagement portion of each of the tank caps cannot be guided by the first engagement portion of a non-corresponding one of the guide portions.

19. The liquid supplying system according to claim 18, further comprising:

a guide screw portion formed on the inner peripheral surface of the guide portion and threadingly engageable with the bottle screw portion, wherein the outer peripheral surface of the tank cap is formed with a screw portion threadingly engageable with the guide screw portion.

20. The liquid supplying system according to claim 19, wherein the screw portion of the tank cap has a configuration identical to a configuration of the bottle screw portion.

21. The liquid supplying system according to claim 1, wherein a plurality of the liquid bottles each according to claim 1 and a plurality of the bottle caps each according to claim 1 are provided, wherein each of the plurality of the bottle caps corresponds to one of the plurality of the liquid bottles, the inner peripheral surface of each bottle cap being provided with an engagement portion corresponding to the first engagement portion of the guide portion, each of the engagement portions being at a position corresponding to a position of the second engagement portion of the corresponding one of the liquid bottles, wherein each of the bottle caps is attachable to the corresponding one of the liquid bottles by the engagement portion of the bottle cap being guided by the second engagement portion of the corresponding one of the liquid bottles, but the engagement portion of the bottle cap cannot be guided by the second engagement portion of a non-corresponding one of the liquid bottles.

22. The liquid supplying system according to claim 21, further comprising:

a guide screw portion formed on the inner peripheral surface of the guide portion and threadingly engageable with the bottle screw portion, wherein the inner peripheral surface of each bottle cap is formed with a cap screw portion threadingly engageable with the bottle screw portion of the corresponding one of the liquid bottles.

23. The liquid supplying system according to claim 22, wherein a plurality of the guide portions each according to claim 1, are provided, and wherein each of the cap screw portions has a configuration identical to a configuration of the guide screw portion of corresponding one of the guide portions.

24. The liquid supplying system according to claim 1, wherein the first engagement portion is a recess.

25. The liquid supplying system according to claim 24, wherein the guide portion has a base end portion connected to the tank, wherein the connection portion has a base end portion connected to the outer wall of the liquid bottle, the liquid supplying system further comprising:

a guide screw portion formed on the inner peripheral surface of the guide portion and threadingly engageable with the bottle screw portion; and a regulating portion abuttable on the protrusion to prevent rotation of the connection portion about an axis thereof relative to the guide portion in a process to disconnect the liquid bottle from the tank, the regulating portion being positioned adjacent to one of: an end of the guide screw portion, the end of the guide screw portion being positioned near the base end portion of the guide portion in the predetermined direction; and an end of the bottle screw portion, the end of the bottle screw portion being positioned near the base end portion of the connection portion, wherein, in a state where the protrusion is in abutment with the regulating portion, the protrusion and the recess are arrayed in line in the predetermined direction.

26. The liquid supplying system according to claim 24, further comprising:

a guide screw portion formed on the inner peripheral surface of the guide portion and threadingly engageable with the bottle screw portion, wherein the protrusion has a protruding length not more than a protruding length of a thread constituting the guide screw portion in the radial direction.

27. The liquid supplying system according to claim 24, further comprising:

a guide screw portion formed on the inner peripheral surface of the guide portion and threadingly engageable with the bottle screw portion, wherein the recess is formed in the guide screw portion and extends in the predetermined direction.

28. The liquid supplying system according to claim 24, wherein the protrusion constituting the second engagement portion has a protruding length not more than a protruding length of the thread constituting the bottle screw portion in the radial direction.

29. A liquid supplying system comprising:

a tank comprising:

a casing defining therein a storage chamber for storing a liquid therein; and an air communicating portion formed in the casing and having an air communication opening through which air is allowed to communicate between the storage chamber and an atmosphere;

a first tubular portion having an inner end positioned inside the storage chamber and an outer end positioned outside of the storage chamber, the inner end being an open end and positioned lower than a part of the air communicating portion, the outer end being an open end to allow the storage chamber to communicate with an outside of the tank;

a second tubular portion through which the storage chamber is allowed to communicate with the outside of the tank;

a guide portion extending in a predetermined direction, the guide portion surrounding the first tubular portion and the second tubular portion as viewed in the predetermined direction, the guide portion having an inner peripheral surface formed with a first engagement portion; and a liquid bottle comprising:

an outer wall define therein an internal space for storing the liquid, and a connection portion connectable to the guide portion and providing communication between the internal space and an outside of the outer wall, the connection portion having an outer peripheral surface formed with a second engagement portion engageable with the first engagement portion, the first engagement portion being configured to guide the second engagement portion to move in the predetermined direction in a process to connect the connection portion to the guide portion, wherein a plurality of the tanks, a plurality of the guide portions, and a plurality of the liquid bottles are provided, each of the plurality of liquid bottles being attachable to a corresponding one of the plurality of tanks, wherein the first engagement portion is a first screw portion, wherein the second engagement portion is a second screw portion threadingly engageable with the first screw portion, wherein a plurality of the first screw portions provide thread pitches different from one another, and wherein a plurality of the second screw portions provide thread pitches different from one another.

30. A liquid supplying system comprising:

a tank comprising:

a casing defining therein a storage chamber for storing a liquid therein; and an air communicating portion formed in the casing and having an air communication opening through which air is allowed to communicate between the storage chamber and an atmosphere;

a first tubular portion having an inner end positioned inside the storage chamber and an outer end positioned outside of the storage chamber, the inner end being an open end and positioned lower chamber to communicate with an outside of the tank;

a second tubular portion through which the storage chamber is allowed to communicate with the outside of the tank, a guide portion extending in a predetermined direction, the guide portion surrounding the first tubular portion and the second tubular portion as viewed in the predetermined direction, the guide portion having an inner peripheral surface formed with a first engagement portion, and a liquid bottle comprising:

an outerwall defining therein an internal space for storing the liquid; and a connection portion connectable to the guide portion and providing communication between the internal space and an outside of the outer wall, the connection portion having an outer peripheral surface formed with a second engagement portion engageable with the first engagement portion, the first engagement portion being configured to guide the second engagement portion to move in the predetermined direction in a process to connect the connection portion to the guide portion, wherein the guide portion further comprises a guide screw portion farmed on the inner peripheral surface of the guide portion, and the first engagement portion is a protrusion, wherein the second engagement portion is engageable with the first engagement portion and the guide screw portion, and the second engagement portion is a recess, wherein the first engagement portion is formed in one of turns constituting a thread of the guide screw portion, the one of the turns being positioned closest to a tip end of the guide portion, and wherein the second engagement portion has a length not more than a pitch of a thread of the guide screw portion in the predetermined direction.

* * * * *